(12) United States Patent
Runstedler et al.

(10) Patent No.: US 8,065,361 B2
(45) Date of Patent: Nov. 22, 2011

(54) APPARATUS AND METHODS USING A DATA HUB SERVER WITH SERVERS TO SOURCE AND ACCESS INFORMATIONAL CONTENT

(75) Inventors: Christopher Runstedler, Cambridge (CA); Rohit Jain, Waterloo (CA); Samer Fahmy, Kitchener (CA); Michael Hardy, Waterloo (CA)

(73) Assignee: Research In Motion Limited, Waterloo, Ontario ( * ) Notice: Subject to any disclaimer, the term of this patent is extended or adjusted under 35 U.S.C. 154(b) by 174 days.

(21) Appl. No.: 12/394,994

(22) Filed: Feb. 27, 2009

(65) Prior Publication Data

US 2010/0223321 A1    Sep. 2, 2010

(51) Int. Cl.
  *G06F 15/16*    (2006.01)
(52) U.S. Cl. .......................... 709/203; 709/217
(58) Field of Classification Search ................ 709/203, 709/225, 226, 228, 229, 217
  See application file for complete search history.

(56) References Cited

U.S. PATENT DOCUMENTS

| | | | |
|---|---|---|---|
| 5,999,611 A | 12/1999 | Tatchell et al. |
| 6,160,877 A | 12/2000 | Tatchell et al. |
| 6,223,291 B1 | 4/2001 | Puhl et al. |
| 6,259,405 B1 | 7/2001 | Stewart et al. |
| 6,301,484 B1 | 10/2001 | Rogers et al. |
| 6,393,484 B1 | 5/2002 | Massarani |
| 6,397,246 B1 | 5/2002 | Wolfe |
| 6,430,170 B1 | 8/2002 | Saints et al. |
| 6,542,491 B1 | 4/2003 | Tari et al. |
| 6,581,025 B2 | 6/2003 | Lehman |
| 6,591,095 B1 | 7/2003 | Palaniswamy et al. |
| 6,615,038 B1 | 9/2003 | Moles et al. |
| 6,628,928 B1 | 9/2003 | Crosby et al. |
| 6,675,165 B1 | 1/2004 | Rothschild |
| 6,684,397 B1 | 1/2004 | Byer et al. |
| 6,728,531 B1 | 4/2004 | Lee et al. |
| 6,781,236 B2 | 8/2004 | Shimooka et al. |
| 6,944,760 B2 | 9/2005 | Wils |
| 6,968,389 B1 | 11/2005 | Menditto et al. |
| 6,981,020 B2 | 12/2005 | Miloslavsky et al. |
| 6,993,326 B2 | 1/2006 | Link, II et al. |
| 7,043,263 B2 | 5/2006 | Kaplan et al. |
| 7,069,319 B2 | 6/2006 | Zellner et al. |
| 7,107,045 B1 | 9/2006 | Knoop |

(Continued)

FOREIGN PATENT DOCUMENTS

EP    0973299 A2    1/2000

(Continued)

OTHER PUBLICATIONS

"GloMop: Global Mobile Computing by Proxy", *White Paper, GloMop Group*, (Sep. 13, 1995), 12 pgs.

(Continued)

*Primary Examiner* — David Lazaro
(74) *Attorney, Agent, or Firm* — Schwegman, Lundberg & Woessner, P.A.

(57) ABSTRACT

Apparatus and methods to engage in accessing informational content in a data hub server, where the informational content is identified as public or partially public to a group registered in the data hub server with permission to access the informational content made public or partially public in the data hub server by another entity, provide a mechanism to enhance the communication capabilities among mobile electronic devices. Additional apparatus, systems, and methods are disclosed.

25 Claims, 11 Drawing Sheets

U.S. PATENT DOCUMENTS

| | | | |
|---|---|---|---|
| 7,127,241 B2 | 10/2006 | Castrogiovanni et al. | |
| 7,171,199 B1 | 1/2007 | Rahman | |
| 7,227,930 B1 | 6/2007 | Othmer et al. | |
| 7,233,975 B1 | 6/2007 | Gerraty et al. | |
| 7,236,769 B2 | 6/2007 | Irlam et al. | |
| 7,349,710 B2 | 3/2008 | Kaplan et al. | |
| 7,415,439 B2 | 8/2008 | Kontio et al. | |
| 7,430,472 B2 | 9/2008 | Zhao et al. | |
| 7,516,478 B2 | 4/2009 | Limont et al. | |
| 7,526,278 B2 | 4/2009 | Link, II et al. | |
| 7,636,574 B2 | 12/2009 | Poosala | |
| 7,640,039 B2 | 12/2009 | Kamada | |
| 7,640,293 B2 | 12/2009 | Wilson et al. | |
| 7,647,409 B2 | 1/2010 | Banerjee et al. | |
| 7,657,271 B2 | 2/2010 | Kim | |
| 7,676,516 B2 | 3/2010 | Boukobza | |
| 7,702,915 B2 | 4/2010 | Mccann et al. | |
| 2002/0013155 A1* | 1/2002 | Jamthe et al. | 455/517 |
| 2003/0008662 A1 | 1/2003 | Stern et al. | |
| 2003/0041125 A1 | 2/2003 | Salomon | |
| 2003/0142653 A1 | 7/2003 | Jiang et al. | |
| 2003/0236823 A1* | 12/2003 | Patzer et al. | 709/203 |
| 2004/0024795 A1 | 2/2004 | Hind et al. | |
| 2004/0042432 A1 | 3/2004 | Riazi et al. | |
| 2004/0053602 A1 | 3/2004 | Wurzburg | |
| 2004/0180673 A1 | 9/2004 | Adams et al. | |
| 2004/0198456 A1 | 10/2004 | Kelkar | |
| 2004/0209650 A1 | 10/2004 | Pearce | |
| 2004/0225525 A1 | 11/2004 | Weitzman | |
| 2004/0249846 A1 | 12/2004 | Randall et al. | |
| 2004/0249961 A1 | 12/2004 | Katsube et al. | |
| 2004/0267873 A1 | 12/2004 | Shen et al. | |
| 2005/0018695 A1 | 1/2005 | Ramaswamy et al. | |
| 2005/0102328 A1 | 5/2005 | Ring et al. | |
| 2005/0141447 A1 | 6/2005 | Carlton et al. | |
| 2006/0021059 A1 | 1/2006 | Brown et al. | |
| 2006/0167940 A1 | 7/2006 | Colton et al. | |
| 2006/0167985 A1 | 7/2006 | Albanese et al. | |
| 2006/0277408 A1 | 12/2006 | Bhat et al. | |
| 2007/0006289 A1 | 1/2007 | Limont et al. | |
| 2007/0027920 A1 | 2/2007 | Alvarado et al. | |
| 2007/0073874 A1 | 3/2007 | Moghaddam et al. | |
| 2007/0180119 A1 | 8/2007 | Khivesara et al. | |
| 2007/0232268 A1 | 10/2007 | Park et al. | |
| 2007/0299918 A1 | 12/2007 | Roberts | |
| 2008/0036591 A1 | 2/2008 | Ray | |
| 2008/0095373 A1 | 4/2008 | Nagata et al. | |
| 2008/0208956 A1* | 8/2008 | Spiridellis et al. | 709/203 |
| 2008/0216148 A1 | 9/2008 | Bienek et al. | |
| 2008/0256204 A1 | 10/2008 | Kamat et al. | |
| 2008/0261569 A1 | 10/2008 | Britt et al. | |
| 2009/0028049 A1 | 1/2009 | Boudreau et al. | |
| 2009/0030968 A1 | 1/2009 | Boudreau et al. | |
| 2009/0030974 A1 | 1/2009 | Boudreau et al. | |
| 2009/0030995 A1 | 1/2009 | Boudreau | |
| 2009/0031250 A1 | 1/2009 | Boudreau | |
| 2009/0031296 A1 | 1/2009 | Boudreau et al. | |
| 2009/0034463 A1 | 2/2009 | Rao | |
| 2009/0068994 A1 | 3/2009 | Murphy | |
| 2009/0070429 A1 | 3/2009 | Murphy | |
| 2009/0125521 A1* | 5/2009 | Petty | 707/9 |
| 2009/0138547 A1 | 5/2009 | Boudreau | |
| 2009/0292799 A1 | 11/2009 | Eisener et al. | |
| 2010/0223359 A1 | 9/2010 | Runstedler et al. | |

FOREIGN PATENT DOCUMENTS

| | | |
|---|---|---|
| EP | 1014629 | 6/2000 |
| EP | 1158438 A2 | 11/2001 |
| EP | 1383347 | 1/2004 |
| EP | 1531641 | 5/2005 |
| EP | 1684535 A1 | 7/2006 |
| EP | 1750422 | 2/2007 |
| WO | WO-0244958 A1 | 6/2002 |
| WO | WO-02087188 A1 | 10/2002 |
| WO | WO-03048964 A1 | 6/2003 |
| WO | WO-2007130214 A2 | 11/2007 |

OTHER PUBLICATIONS

"GloMop: Global Mobile Computing by Proxy, GloMop Technology Overview", fox@cs.berkeley.edu—Armando's home page; file:/C:\unzipped\pythia_demo_pages\pythia\index.html, White Paper. Dated Jul. 6, 2005, (Downloaded Jul. 6, 2005), 11 pgs.

Bartlett, Joel F., "Experience with a Wireless World Wide Web Client", *WRL Technical Note TN-46*, White Paper, This is a preprint of a paper that will be presented at IEEE Spring COMPCON95, San Francisco, California, Mar. 5-9, 1995, 17 pgs.

Courtois, Todd, et al., "Portal: a PDA to World Wide Web Interface", *PDA Developers* vol. 3.1, (Jan./Feb. 1995), 18-20.

Greenberg, S., et al., "POAs and Shared Public Displays: Making Personal Information Public, and Public Information Personal", *Personal Technologies*, (Mar. 1999), 11 pgs.

Joshi, Anupam, "Mowser: Mobile Platforms and Web Browsers", *Bulletin of the IEEE Techinical Committee on Operating Systems and Application Environments 8*, No. 1, (1996), 6 pgs.

Watson, T., "Application design for wireless computing", *Workshop on Mobile Computing Systems and Applications, 1994. Proceedings. Workshop on Mobile Computing Systems and Applications; Citation*: Dec. 8-9, 1994, Santa Cruz, CA, (1994), 91-94.

* cited by examiner

APPARATUS AND METHODS USING A DATA HUB SERVER WITH SERVERS TO SOURCE AND ACCESS INFORMATIONAL CONTENT

BACKGROUND

Access to information is an important factor in the activities of individuals in modern society. Improvements to the flow of information enhance one's ability to interact with others, to respond to changing needs, and to avail oneself of enjoyment from processing various media based information.

BRIEF DESCRIPTION OF THE DRAWINGS

Embodiments of the invention are illustrated by way of example and not limitation in the figures of the accompanying drawings in which.

DETAILED DESCRIPTION

Figure 1:
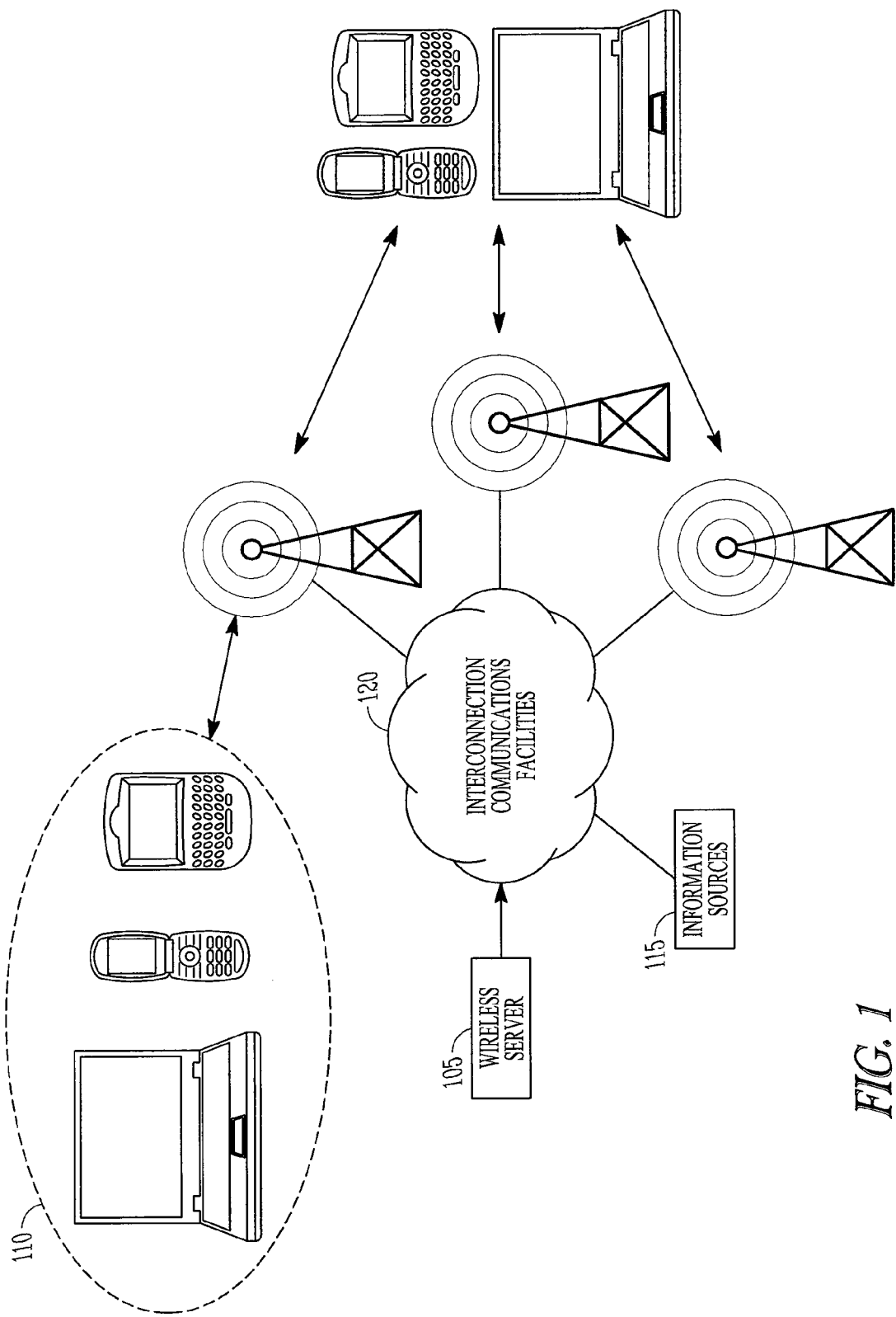
FIG. 1 illustrates an embodiment of an architecture for operation of mobile wireless devices registered in a wireless server, according to various embodiments.

The following detailed description refers to the accompanying drawings that show, by way of illustration, details and embodiments in which the invention may be practiced. These embodiments are described in sufficient detail to enable those skilled in the art to practice embodiments of the invention. Other embodiments may be utilized and structural, logical, and electrical changes may be made. The various embodiments disclosed herein are not necessarily mutually exclusive, as some embodiments can be combined with one or more other embodiments to form new embodiments. The following detailed description is, therefore, not to be taken in a limiting sense.

In various embodiments, informational content sourced from a server can be accessed in a data hub server by another server in which the informational content is categorized in the data hub as public data with respect the accessing server. The informational content can be transferred to the data hub server from the server associated with the generation of the informational content using directed transmission between the server and the data hub server. The informational content can be transferred from the data hub server to the accessing server using directed transmission between the data hub server and the accessing server.

The public status of the informational data can be based on a registration relationship between a user of the server associated with the generation of the informational content and a user of the accessing server. The registration relationship can be realized as a registration within one of both mobile electronic devices of the respective users. In addition, the public status of the informational data may further be based on a sharing registration of the mobile electronic device as a client of the server associated with the generation of the informational content as public and a sharing registration of the mobile electronic device as a client of the accessing server. In a sharing registration of a user or the mobile electronic device of the user with a server, the user or the mobile electronic device of the user shares data stored on the server with other similarly registered users in the server or the mobile electronic devices of the users in the server. In various embodiments, each mobile electronic device is configured as a mobile wireless device and arranged as a mobile wireless client of its associated server configured as a wireless server.

In various embodiments, an arrangement of apparatus can include a sourcing mobile electronic device as a client of a server, the server associated with the sourcing of informational content, a data hub server, an accessing server, and an accessing mobile electronic device as a client of the second server. Each apparatus of the arrangement can be structured to perform operations within the apparatus for engaging in accessing informational content in a data hub server, with the informational content being sourced through a first server based on a relationship of the first server with a first mobile electronic client of the first server, where accessing the informational content can be based on a registration associated with a second mobile client of a second server, with the registration including an indicator of permission to access the informational content. In various embodiments, these apparatus can be configured for engaging in the access of informational content such that the management of the access may be conducted with limited user interaction and, in various embodiments, the apparatus may perform various operations essentially autonomously.

By informational content, it is meant information for direct use by a user rather than data exchange between devices operating to accomplish a task not perceived by the user. Informational content can be presented in various forms including, but not limited to, files, data, and media content.

A user can access the informational content on electronic apparatus having input/output devices corresponding to the format of the informational content used. For example, media content can be transferred in audio media format, video media format, multi-media format, or other format that provides a presentation to be accessed as information or entertainment or both information and entertainment for use by an individual. In various embodiments, media content is managed in a system.

Systems and methods for managing media content may be configured such that the management may be conducted with limited user interaction and, in various embodiments, the system may perform essentially autonomously. Media is a form of general communication, information, or entertainment in society, which is typically intended to be used by a large audience, thought not limited to a large audience. Various media may include, but are not limited to, music, movies, music videos, television shows, interactive applications, audio books, podcasts, games, and other presentations. Each form of media may be referred to as media content or media art. Associated with a item of media art that is stored or processed on an apparatus is a media file, which when operated on by an associated playing device (player) provides an output that can be presented as communication, information, entertainment, other presentations, or combinations thereof for the user.

Systems that manage media content and other informational content can include computers such as a personal computer (PC). A personal computer herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, some form of keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a PC manages media content in relationship to one or more mobile electronic devices. These mobile electronic devices that can play media files and interact with the PC with respect to the management of media content on the mobile electronic device. In various embodiments, the mobile electronic devices include instrumentalities similar to those of the PC to manage the media content on the mobile electronic device, to browse media files in one or more PCs, and to engage with a PC in interactive management of media content on the mobile electronic device, the PC, and on other mobile electronic devices in which the media content may be shared. The mobile electronic device can be a mobile wireless device that includes communication features. Mobile wireless devices may include, but are not limited to, mobile telephones, portable computers, personal digital assistants, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

In various embodiments, a machine-readable medium stores instructions, which when performed by a machine, cause the machine to perform operations comprising engaging in accessing informational content in a data hub server, where the informational content can be sourced through a first server based on a relationship of the first server with a first mobile electronic client of the first server with accessing the informational content being based on a registration associated with a second mobile client of a second server, where the registration includes an indicator of permission to access the informational content. The machine-readable medium can also store parameters used in execution of the instructions and can also store appropriate results from execution of the instructions. The first mobile electronic device can have a share registration in the first server as a client of the first server and the second mobile electronic device can have a share registration in the second server as a client of the second server.

The instructions can include instructions to transmit the informational content from the first server to the data hub server using directed transmission from the first server to the data hub server. The instructions can include instructions to transmit the informational content from data hub server to the second server using directed transmission from data hub server to the second server. Directed transmission can be realized over a network of interconnected computer networks that interchange data using a standardized protocol. Such a network may include the Internet. Directed transmission over such a network can be used to share informational content between the first mobile electronic device and the second mobile electronic device. This directed transmission over such a network can allow for the transmission of the informational content without incurring over-the-air costs associated with transfer of the informational content between the first server and the data hub server or between the second server and the data hub server or both transfers, where the first server and the second server are configured as wireless servers in which the first mobile electronic client and the first mobile electronic client, respectively, are registered wireless clients. The directed transmission can be set up as a secure tunnel over the Internet.

A sharing registration of a mobile electronic device in a server establishes a trust relationship between the mobile electronic device and the server, where the registration provides an establishment of permissions for sharing data upon other mobile electronic devices registered in the same server based on a shared characteristic of the mobile electronic devices. An example of a trust relationship between a mobile wireless device and a wireless server in which the mobile wireless device is registered as a client of the wireless server is provided with respect to the discussion of FIGS. 1-5.

FIG. 1 illustrates an embodiment of an architecture for operation of mobile wireless devices having a share registration in a wireless server 105. The share registration in wireless server 105 allows various forms of data to be shared about various mobile wireless devices so registered in wireless server 105. The example architecture includes a wireless server 105 that provides a variety of services to a group 110 of mobile wireless devices. Wireless server 105 includes instrumentality to manage the operation of group 110 of mobile wireless devices under a common criterion or a common set of criteria associated with the share registration of these mobile wireless devices in server 105.

Wireless server 105 can control dissemination of data among group 110. In some instances, the data may be shared between one or more of the mobile wireless devices in group 110. In some instances, the information may be shared to less than all the mobile wireless devices in group 110. A privacy status may be used to maintain and regulate the privacy of the data relative to both members of group 110 and entities external to group 110. Wireless server 105 can access information sources 115 using interconnection communication facilities 120. Information sources 115 may include a wide variety of sources that provide informational content in various formats. Information sources 115 may include informational content in an open format without restrictions on what entities may access the informational content. Information sources 115 may include informational content in an open format requiring enrollment by the entities to the informational content without further restrictions. Information sources 115 may include informational content accessible based on a subscription to the informational content. Information sources 115 may include informational content accessible under a privacy condition administered by the corresponding information sources 115.

Data from the informational sources may include, but is not limited to, photographs, documents, music, video, audio transmissions, e-mail, messages, telephonic communications, personalized data, computational data, operational data, and combinations thereof. Personalized data may include, but is not limited to, an individual's personal calendar entries, notes, contacts (names, addresses, phone numbers, e-mail address, etc.), memos, and other data personal to an individual. The informational content may be provided in a variety of electronic formats. Such electronic formats may include file formats having extensions that include, but are not limited to, doc, dot, wpd, txt, xls, pdf, ppt, jpg, jpeg, png, bmp, gif, html, htm, zip, tif, tiff, wmf, mp3, and wav.

Interconnection communications facilities 120 may include one or more communication networks that allow transfer of data among wireless server 105, group 110 of mobile wireless devices, information sources 115, and other communication entities accessible in conjunction with interconnection communications facilities 120. Interconnection communications facilities 120 may be configured as a local area network, a wide area network, or combinations thereof. In addition, interconnection communications facilities 120 may be configured to include a private network. Interconnection communications facilities 120 may be realized using one or more transmission media. Such transmission media may include one or more of fiber optics, wired pairs, cable, or wireless media. In an embodiment, wireless server 105 and members of the group 110 of mobile wireless devices may communicate directly without using interconnection communication facilities 120. Interconnection communications facilities 120 allow communication between wireless server 105 and members of group 110 in a wireless infrastructure that includes mobile wireless devices that do not share a common criterion or a common set of criteria with the wireless server 105 and members of group 110, but use the same wireless infrastructure or at least portions of the same wireless infrastructure.

In an embodiment, wireless server 105 and group 110 of mobile wireless devices have an intrinsic relationship from registration of group 110 of mobile wireless devices such that wireless server 105 operates in large part based on the intrinsic relationship with group 110. The intrinsic relationship may be used to define a share group. A share group is two or more entities that share information in which the entities have a trusted relationship. The trusted relationship may be directed to and held by one of the entities of the group. Wireless server 105 may be realized as software integrated into a machine that provides simplified operation of the machine around the core of group 110. Group 110 may be defined by a set of people having a common relationship implementable in wireless server 105. The set of people may range from one to thousands. For group 110 of mobile wireless devices, the intrinsic relationship may be generated by a common use of wireless server 105 in which wireless server 105 shares information among the members of group based on a unique identifier of a user group 110 being a user of wireless server 105. The relationship may be initiated by installing unique identifiers of each member in a storage medium of wireless server 105 as a registration of the members to create a share group.

In an embodiment, communications between a mobile wireless device of group 110 and wireless server 105 can be conducted over a secure communication channel. The secure communication channel may be correlated to the unique identification that establishes the group relationship of the wireless mobile device to the share group of wireless server 105. Wireless server 105 may communicate with the mobile wireless clients over a wireless channel that is secured. The secure channel can be provided using encrypted data for security. In an embodiment, the data may be encrypted using the advanced encryption standard (AES).

In various embodiments, wireless server 105 can be realized as group software installed on an existing machine having a controller, such as one or more processors, and machine-readable medium to store the instructions of the group software. In some embodiments, wireless server 105 can be realized as a system having hardware and software to execute the functions for the share group defined by wireless server 105 and group 110 of mobile wireless devices. In various embodiments, a simplified user interface (UI) may be provided to execute and operate the group software of wireless server 105.

In various embodiments, wireless server 105 can be used to implement services from a network provider. A network provider provides a user with access to a communication network and typically provides access to information services associated with the provided access to a communication network. Wireless server 105 may be associated with multiple network providers dependent upon the network provider services to which the registered users of wireless server 105 have entered agreements. Wireless server 105 can be in a client-server relationships with a variety of systems and devices, including mobile wireless devices of group 110 and web-based clients. Wireless server 105 serves as a staging area for the dissemination of informational content to one or more mobile wireless clients of a share group of wireless server 105.

Wireless server 105 and mobile wireless devices 110 can operate as a share group having secured communication and secured sharing by means of wireless server 105. Wireless server 105 includes a list of identifiers that uniquely identifies each mobile wireless device of group 110 as clients belonging to a user that is also a user of wireless server 105. Establishing the unique identifiers in wireless server 105 and each corresponding mobile wireless device 110 can define the trust relationship for the share group. The identities of each of the mobile wireless clients may be correlated to its secure remote password (SRP) key. The SRP key may be used for authentication when connecting to a wireless network. The SRP key provides a unique identifier for wireless server 105 and may indicate usage of a secure channel. The SRP keys may be used for registering the wireless server 105 and determining that wireless server 105 has a unique relationship with a wireless client to communicate with a network infrastructure. SRP key also allows an identification of a mobile wireless device as a client of wireless server 105 over a direct plug-in channel or an unsecured Wi-Fi channel. A SRP key can be implemented in any acceptable manner depending on the security needs of the situation. The implementation may range from simple combinations, such as the current date and time, to the use of complex cryptographic algorithms. Simple implementations may be used in environments that are very benign with respect to security. When security concerns are high, complex cryptographic algorithms may be used. Various combinations of security measures may be implemented with the SRP key.

The share group may have several levels for a privacy state. The privacy state may include, but is not limited to, a status as being owned by one user associated with one of mobile wireless devices of group 110, a status as being shared among two or more of mobile wireless clients of group 110 but less than all the mobile wireless devices, a status as being shared among all of mobile wireless devices of group 110, and a status as being shared or accessible by entities outside the group of mobile wireless devices of group 110 in addition to being shared among all of mobile wireless devices 110. A status as being shared or accessible by entities outside the group of mobile wireless clients 110 may include specified entities permitted accessibility.

Figure 2:
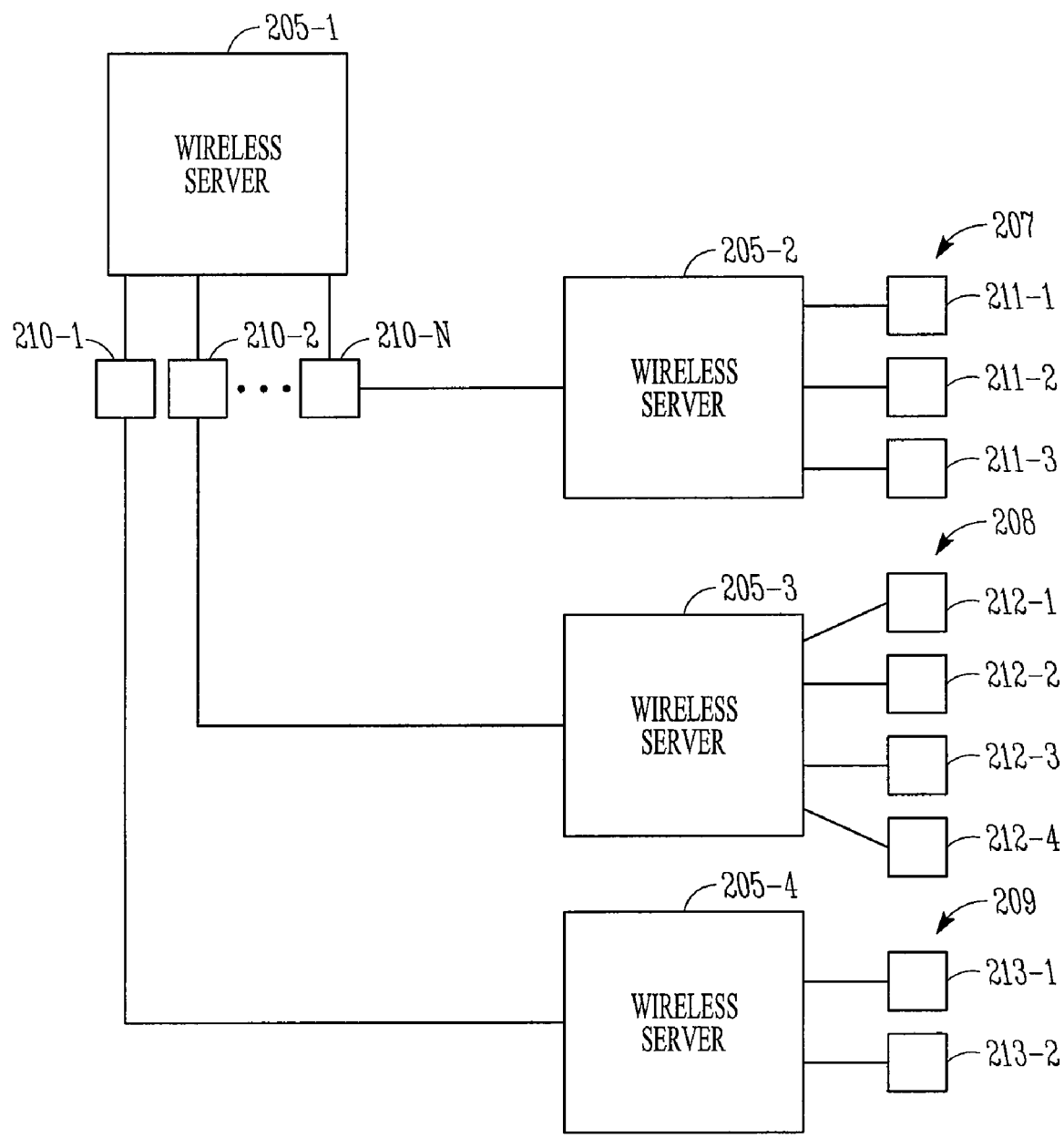
FIG. 2 depicts an embodiment of a wireless architecture in which a relationship between mobile wireless devices as clients of multiple wireless servers is illustrated, according to various embodiments.

FIG. 2 depicts an embodiment of a wireless architecture in which a relationship between mobile wireless devices as clients of multiple wireless servers is illustrated. Wireless server 205-1 provides wireless services, similar to those services discussed with respect to wireless server 105 of FIG. 1, to the group of mobile wireless devices 210-1, 210-2 . . . 210-N as a primary wireless server for the group. Members of the group may individually belong to another group associated with another wireless server, in which such a wireless server is secondary wireless server. For example, wireless servers 205-2, 205-3, and 205-4 are configured to groups 207, 208, and 209, respectively. Group 207 includes mobile wireless devices 211-1, 211-2, and 211-3. Group 208 includes mobile wireless devices 212-1, 212-2, 212-3, and 212-4. Group 209 includes mobile wireless devices 213-1 and 213-2. Mobile wireless device 210-N may also belong to group 207 in which case wireless server 205-2 is a secondary wireless server for mobile wireless device 210-N. Mobile wireless device 210-2 may also belong to group 208 in which case wireless server 105-3 is a secondary wireless server for mobile wireless device 210-2. Mobile wireless device 210-1 may also belong to group 209 in which case wireless server 205-4 is a secondary wireless server for mobile wireless device 210-1. In an embodiment, a mobile wireless client can be assigned to a primary wireless server as a group member and can be assigned, as a group member, to multiple secondary wireless servers.

In an embodiment, the functioning of a mobile wireless client with a primary wireless server and with one or more secondary wireless servers can be controlled by the policies of the wireless servers, where the policies of the primary wireless server dominate the policies of the secondary wireless servers. The assignment of a primary wireless server may include a negotiation in which the user of the mobile wireless client agrees to make a specific wireless server its primary wireless server in return for assignment to the group of the specific wireless server. Such negotiation may result in termination of some service features provided by the wireless servers upon the identification of these wireless servers as being secondary. Due to conflicts between wireless servers, a mobile wireless device may be limited in the number of secondary wireless server groups to which it belongs as a registered client.

For two mobile wireless devices in which the mobile wireless devices are not registered in the same server, informational content can be transferred between the two mobile wireless devices using directed transmission between the servers associated with the respective mobile wireless devices and a data hub server. The transfer can be based on a trust relationship between the two mobile wireless devices in which informational content from one of the mobile wireless devices is flagged in the data hub server as being public information for the other mobile wireless. Access by one mobile wireless device of informational content in the data hub server sourced from the other mobile wireless device may include exchange and verification of a password correlated to the public status of the information content for the accessing mobile wireless device relative to the sourcing mobile electronic device. In various embodiments, one of the mobile wireless devices can have a share registration in one server and the other mobile wireless device can have a share registration in the other server, where the two mobile wireless devices are without a share registration in the same server, other than the public registration in the data hub server. Such sharing of informational content using a data hub server is not limited to two mobile wireless devices. In various embodiments, a mobile wireless device arranged as a mobile wireless client of a wireless server can make informational content public, in the data hub server, to a number of other mobile wireless clients of one or more other wireless servers.

Figure 3:
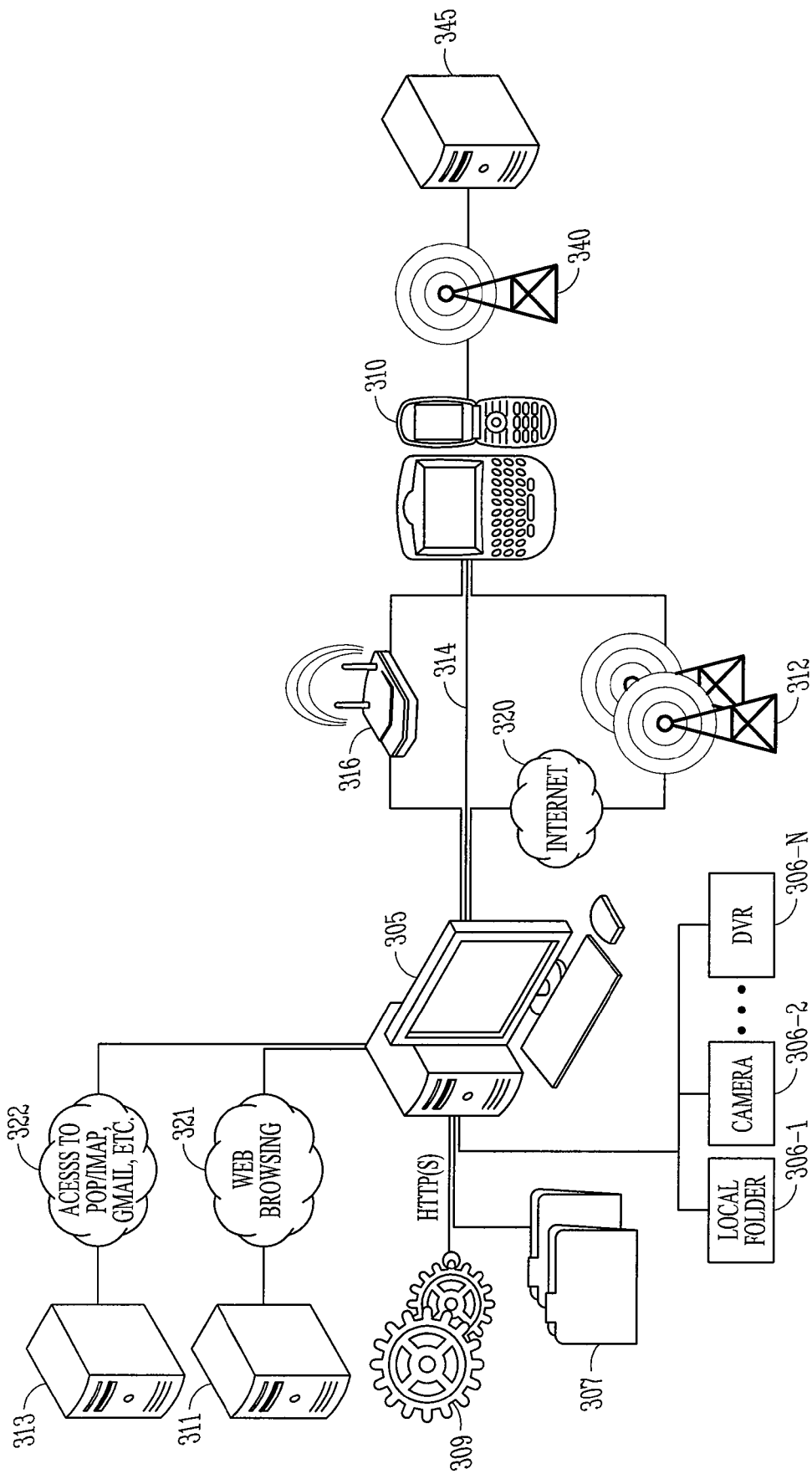
FIG. 3 illustrates a block diagram of features of an architecture for mobile wireless devices registered in a wireless server, according to various embodiments.

FIG. 3 illustrates a block diagram of features of an architecture for mobile wireless devices 310 registered in a wireless server 305, according to various embodiments. The architecture includes a local PC 305 arranged as a wireless server for mobile wireless devices 310 such that the registered mobile wireless devices 310 are clients of local PC 305. Local PC 305 can be configured as a wireless server using software and supporting hardware, where local PC 305 can be realized as a home wireless server or as a small office/home office (SOHO) wireless server. As a home wireless server, local PC 305 provides a mechanism for a family to share informational content and manage operation of mobile wireless devices 310 of the family. As a small office/home office (SOHO) wireless server, local PC 305 provides a mechanism for members of a small business to share business information, which can be provided in a number of different formats, and manage operation of the small business related activities of mobile wireless devices 310.

Mobile wireless devices 310 can be registered in local PC 305 such that mobile wireless devices 310 share various forms of information with each other based on and through registration in local PC 305. Each mobile wireless device is registered on a unique basis with respect to the other mobile wireless devices 310 registered in local PC 305. Local PC 305 includes a list of identifiers that uniquely identifies each of the mobile wireless devices 310 as belonging to a user that is also a user of local PC 305. The identities of each of mobile wireless devices 310 may be correlated to its secure remote password key. The SRP key may be used for authentication when connecting to a wireless network, such as via cellular network 312, where each of mobile wireless devices 310 can operate with local PC 305 over a secured communication channel that is automatically established in initiating a communication session.

The SRP key provides a unique identifier for local PC 305 and may also indicate usage of a secure channel. The SRP keys may be used for registering local PC 305 and determining that local PC 305 has a unique relationship with a mobile wireless device to communicate with a network infrastructure. A SRP key also allows an identification of a mobile wireless device with local PC 305 over a direct plug-in channel, such as universal serial bus (USB) cable 314, or a secured or an unsecured Wi-Fi channel 316. A SRP key can be implemented in any acceptable manner depending on the security needs of the situation. The implementation may range from simple combinations, such as the current date and time, to the use of complex cryptographic algorithms. Simple implementations may be used in environments that are very benign with respect to security. When security concerns are high, complex cryptographic algorithms may be used. Various combinations of security measures may be implemented with the SRP key.

Based on the registration, local PC 305 can act as an administrator for mobile wireless devices 310 registered in local PC 305 to provide managerial functions for mobile wireless devices 310 as a single unique group. Among mobile wireless devices 310, local PC 305 can manage: file transfer folders 307; access to third party applications 309, which may be performed by various combinations of hyper text transfer protocol (http) and hyper text transfer protocol secure (https) or other mechanisms; access to an internet service provider (ISP) 313 for internet message access protocol (IMAP) mail accounts/a post office protocol (POP) system accounts/ google mail (GMAIL) accounts, or other e-mail accounts; access to web servers 311, and access to locally controlled devices to the home/SOHO such as, but not limited to, local folders 306-1, camera 306-2 or home/SOHO monitoring equipment, ... DVRs (digital video recorders) 306-N or other home/SOHO media equipment.

Informational content, which may be shared among mobile wireless devices 310, can include, but is not limited to, photographs, documents, music, video, audio transmissions, e-mail, messages, telephonic communications, personalized data, computational data, operational data, and combinations thereof. Personalized data may include, but is not limited to, an individual's personal calendar entries, notes, contacts (names, addresses, phone numbers, e-mail address, etc.), memos, and other data personal to an individual. The informational content may be provided in a variety of electronic formats. Such electronic formats may include file formats having extensions that include, but are not limited to, doc, dot, wpd, txt, xls, pdf, ppt, jpg, jpeg, png, bmp, gif, html, htm, zip, tif, tiff, wmf, mp3, and wav.

The sharing of information among mobile wireless devices controlled by local PC 305 may have several levels for a privacy state. The privacy state may include, but is not limited to, a status as being owned by one user associated with one of mobile wireless devices 310, a status as being shared among two or more of mobile wireless devices 310 but less than all mobile wireless devices 310, a status as being shared among all of mobile wireless devices 310, and a status as being shared or accessible by entities outside the group of mobile wireless devices 310 in addition to being shared among all of mobile wireless devices 310. A status as being shared or accessible by entities outside the group of mobile wireless devices 310 may include specified entities permitted accessibility.

Local PC 305 can be configured to regulate various flows of informational content and the management of the mobile wireless devices 310 on an autonomous basis according to profiles established in local PC 305 for various ones of mobile wireless devices 310. The profiles can be established according to various policies that control not only the flow of informational content shared among the mobile wireless devices 310, but also the use of individual wireless devices of the group of mobile wireless devices. For instance, with a local home PC 305 configured as a wireless server for mobile wireless devices 310 of family members, the policies can regulate flow of e-mail messages, instant messaging communications, page messages, text communications, and/or telephonic calls of the family. The administrator for such a local home PC 305 can be correlated to one or more of mobile wireless devices 310 assigned to one or more parents. The parents can set the management parameters individually for each of mobile wireless devices 310 of the family directly on local home PC 305 or using a mobile wireless device designated as an administrator to set the parameters in local home PC 305. In a similar manner, an administrator for a SOHO can be correlated to a particular mobile wireless device associated with the manager of the SOHO.

Local PC 305 can provide synchronization of the transfer of informational content among the mobile wireless devices 310. Given a profile established in local PC 305, the acquisition of informational content in local PC 305 can automatically generate a linkage of the informational content to various folders that provide access to the folder content by select ones of mobile wireless devices 310. In addition, users of mobile wireless devices 310 can browse the content of local PC 305 using a browser on mobile wireless devices 310.

Users of mobile wireless devices 310 can also conduct web browsing through web servers 311 accessed through local PC 305.

The architecture of FIG. 3 includes a local PC 305 arranged as a wireless server for mobile wireless devices 310, with connectivity to wired networks 320, 321, 322. Wired networks 320, 321, 322 can be arranged as individual networks. Wired networks 320, 321, 322 can be arranged as a network of interconnected computer networks that interchange data using a standardized protocol. Such a network may include the Internet.

A mobile wireless device in the group of mobile wireless devices 310 can also be registered in a business server 345, separate from local PC 305, in which the mobile wireless device communicates with business server 345 over cellular network 340. Interaction of the mobile wireless device and business server 345 can be regulated under policies associated with business server 345. For the given mobile wireless device, one of the sets of policies associated with local PC 305 and business server 345 may function as the dominant policy for operating the given mobile wireless device. The status of a dominate policy can be changed between the two sets of policies.

Mobile wireless devices 310 can exchange operational parameters and informational content with local PC 305 over various mediums. A communication session between local PC 305 and one or more of mobile wireless device 310 can be conducted over cellular network 312. A communication session between local PC 305 and an individual mobile wireless device 310 can be conducted USB cable 314. A communication session between local PC 305 and one or more of mobile wireless device 310 can be conducted over a Wi-Fi network 316. Wi-Fi network 316 maybe a home Wi-Fi network. Wi-Fi network 316 may be a Wi-Fi network coupled to the Internet, where such a Wi-Fi network can be accessed by a mobile wireless device.

Figure 4A:
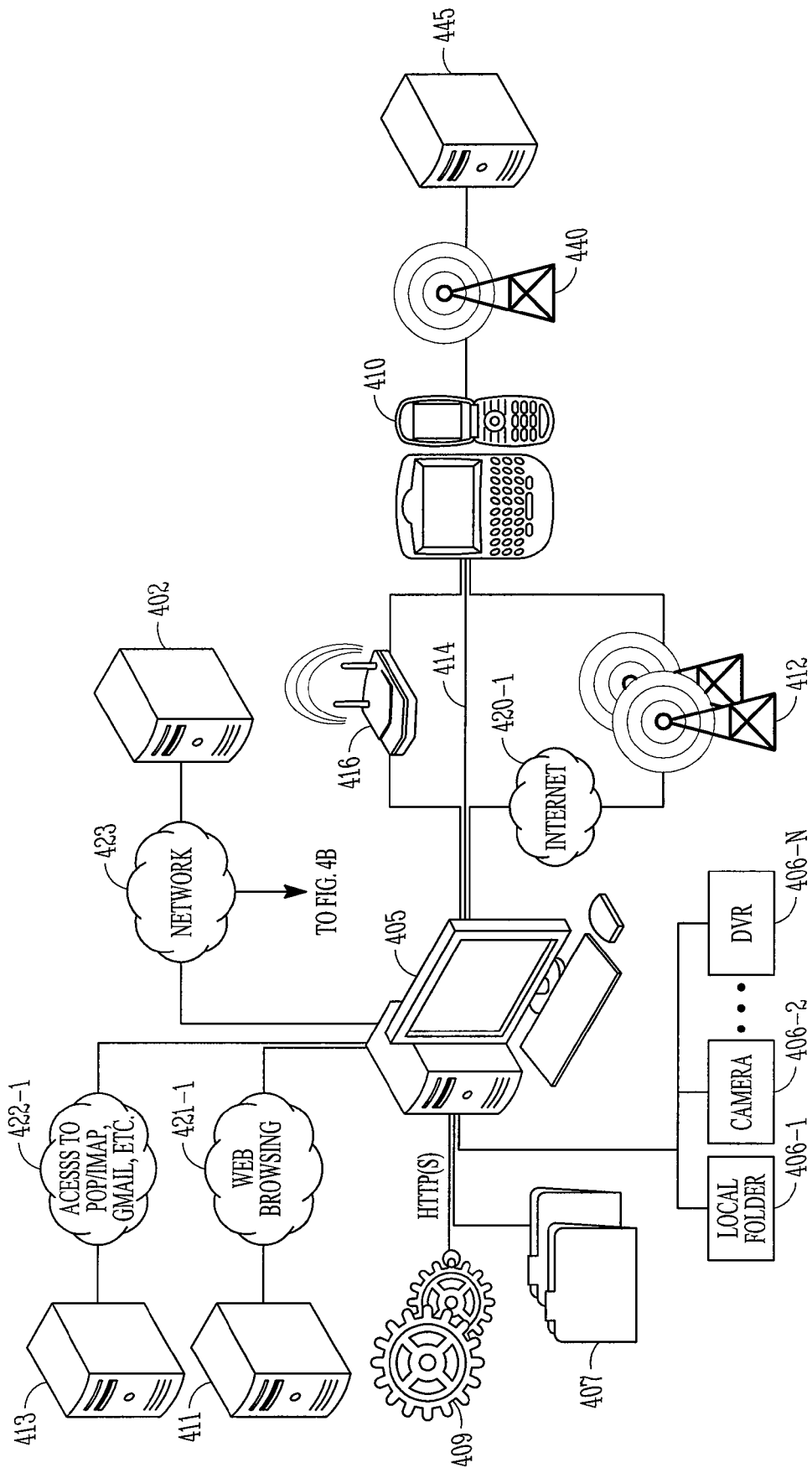
FIGS. 4A and 4B illustrate a block diagram of features of an architecture for mobile wireless devices registered in different wireless servers, according to various embodiments.
Figure 4B:
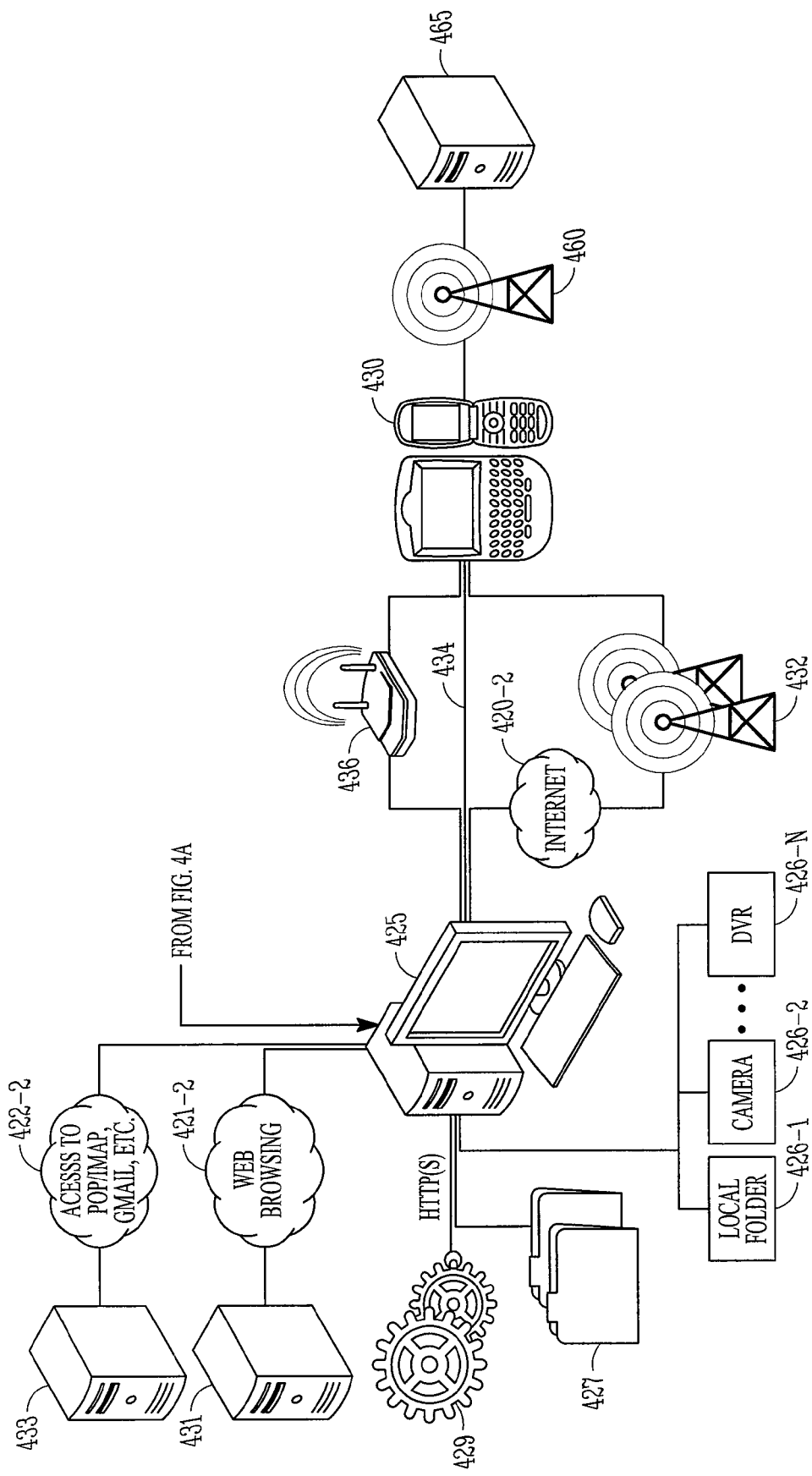

FIGS. 4A and 4B illustrate a block diagram of features of an architecture for mobile wireless devices registered in different wireless servers. In various embodiments, mobile wireless devices 410 are registered in local PC 405 according to a share arrangement among the wireless devices 410 and local PC 405. Local PC 405 can be configured as a wireless server arranged as a home wireless server or a SOHO wireless server, for example. The arrangement of mobile wireless devices 410 and local PC 405 can be implemented with the functions and characteristics similar to or identical to the functional arrangement of mobile wireless devices 310 and local PC 305 as discussed with respect to the architecture of FIG. 3.

For example, based on the registration, local PC 405 can act as an administrator for mobile wireless devices 410 registered in local PC 405 to provide managerial functions for mobile wireless devices 410 as a single unique group. Among mobile wireless devices 410, local PC 405 can manage: file transfer folders 407; access to third party applications 409, which may be performed by various combinations of hyper text transfer protocol (http) and hyper text transfer protocol secure (https) or other mechanisms; access to an internet service provider (ISP) 413 for internet message access protocol (IMAP) mail accounts/a post office protocol (POP) system accounts/google mail (GMAIL) accounts, or other e-mail accounts; access to web servers 411, and access to locally controlled devices to the home/SOHO such as, but not limited to, local folders 406-1, camera 406-2 or home/SOHO monitoring equipment, . . . DVRs (digital video recorders) 406-N or other home/SOHO media equipment.

In addition, the architecture of FIGS. 4A and 4B includes local PC 405 arranged as a wireless server for mobile wireless devices 410, with connectivity to wired networks 420-1, 421-1, 422-1, and 423. Wired networks 420-1, 421-1, 422-1, and 423 can be arranged as individual networks. Wired networks 420-1, 421-1, 422-1, and 423 can be arranged as a network of interconnected computer networks that interchange data using a standardized protocol. Such a network may include the Internet. Via cellular network 440, a mobile wireless device in the group of mobile wireless devices 410 can also be registered in a business server 445, separate from local PC 405.

Mobile wireless devices 410 can exchange operational parameters and informational content with local PC 405 over various mediums. A communication session between local PC 405 and one or more of mobile wireless device 410 can be conducted over cellular network 412. A communication session between local PC 405 and an individual mobile wireless device 410 can be conducted using USB cable 414. A communication session between local PC 405 and one or more of mobile wireless device 410 can be conducted over a Wi-Fi network 416. Wi-Fi network 416 may be a home Wi-Fi network. Wi-Fi network 416 may be a Wi-Fi network coupled to the Internet, where such a Wi-Fi network can be accessed by a mobile wireless device.

Mobile wireless devices 430 are registered in local PC 425 according to a share arrangement among the wireless devices 430 and local PC 425. Local PC 425 can be configured as a wireless server arranged as a home wireless server or a SOHO wireless server, for example. The arrangement of mobile wireless devices 430 and local PC 425 can be realized to have the functions and characteristics similar to or identical to the functional arrangement of mobile wireless devices 310 and local PC 305 as discussed with respect to the architecture of FIG. 3.

For example, based on the registration, local PC 425 can act as an administrator for mobile wireless devices 430 registered in local PC 425 to provide managerial functions for mobile wireless devices 430 as a single unique group. Among mobile wireless devices 430, local PC 425 can manage: file transfer folders 427; access to third party applications 429, which may be performed by various combinations of hyper text transfer protocol (http) and hyper text transfer protocol secure (https) or other mechanisms; access to an internet service provider (ISP) 423 for internet message access protocol (IMAP) mail accounts/a post office protocol (POP) system accounts/google mail (GMAIL) accounts, or other e-mail accounts; access to web servers 421, and access to locally controlled devices to the home/SOHO such as, but not limited to, local folders 426-1, camera 426-2 or home/SOHO monitoring equipment, . . . DVRs (digital video recorders) 426-N or other home/SOHO media equipment.

In addition, the architecture of FIGS. 4A and 4B includes local PC 425 arranged as a wireless server for mobile wireless devices 430, with connectivity to wired networks 420-2, 421-2, 422-2, and 423. Wired networks 420-2, 421-2, 422-2, and 423 can be arranged as individual networks. Wired networks 420-2, 421-2, and 422-2 may be common to respective wired networks 420-1, 421-1, and 422-1. Wired networks 420-2, 421-2, 422-2, and 423 can be arranged as a network of interconnected computer networks that interchange data using a standardized protocol. Such a network may include the Internet. Via cellular network 460, a mobile wireless device in the group of mobile wireless devices 430 can also be registered in a business server 465, separate from local PC 425.

Mobile wireless devices 430 can exchange operational parameters and informational content with local PC 425 over various mediums. A communication session between local PC 425 and one or more of mobile wireless device 430 can be conducted over cellular network 432. A communication session between local PC 425 and an individual mobile wireless device 430 can be conducted using USB cable 434. A communication session between local PC 405 and one or more of mobile wireless device 410 can be conducted over a Wi-Fi network 436. Wi-Fi network 436 may be a home Wi-Fi network. Wi-Fi network 436 may be a Wi-Fi network coupled to the Internet, where such a Wi-Fi network can be accessed by a mobile wireless device.

In various embodiments, one or more of mobile wireless devices 410 are not registered in local PC 425 and one or more of mobile wireless devices 430 are not registered in local PC 405. However, informational content can be shared between two mobile wireless devices that are not registered with a share arrangement in the same local wireless server. The informational content can be shared using the registration arrangement of each mobile wireless device with its own local PC with transfer of the informational content conducted through hub server 402 that can engage in data transfer by directed communication with each of the corresponding local PCs. For example, a mobile wireless device of the group 410 can share informational content with a mobile wireless device of the group 430 by initiating transfer of the informational content from local PC 405 to hub server 402 over network 423. Local PC 425 can access the informational content in hub server 402 with proper permissions and make the informational content available to the mobile wireless device of the group 430 based on its profile in local PC 425. In a similar manner, a mobile wireless device of the group 430 can share informational content with a mobile wireless device of the group 410. With network 423 being the internet, the transfer can be conducted in a cost efficient, time efficient convenient manner.

Figure 5:
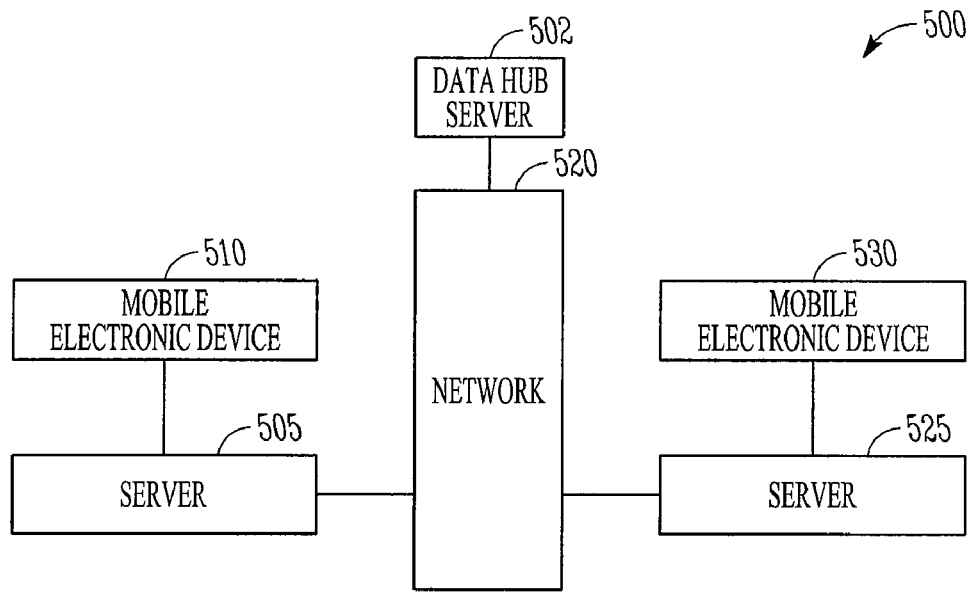
FIG. 5 illustrates a block diagram of features of an architecture arranged for sharing informational content using a data hub server, according to various embodiments.

FIG. 5 illustrates a block diagram of features of an architecture 500 arranged for sharing informational content using a data hub server 502, according to various embodiments. Architecture 500 shows mobile electronic device 510 interrelated with server 505 and mobile electronic device 530 interrelated with server 525. The interrelation of server 505 with mobile electronic device 510 can include the share registration of mobile electronic device 510 in server 505 as a client of server 505. The interrelation of server 525 with mobile electronic device 530 can include the share registration of mobile electronic device 530 in server 525 as a client of server 525. The share registration relationship between a mobile electronic device and its server allows a user of the mobile electronic device to manage properties of the mobile electronic device through accessing and operating applications on the server. Such a server can be configured in a PC to provide enhanced user control of its registered mobile electronic devices. The registration relationship also allows a user of a mobile electronic device to access applications, data, and informational content on or through the server in which it is registered. In various embodiments, mobile electronic devices 510 and 530 are mobile wireless devices and servers 505 and 525 are wireless servers.

The interrelationship of server 505 with mobile electronic device 510 and the interrelationship between of server 525 with mobile electronic device 530 may each be realized using communications between the mobile electronic device and its corresponding server over a network such as shown in FIGS. 1-4. Such a network can be a local area network, a wide area network, or combinations thereof. The network can be a wireless network, a wired network, and combinations thereof. An example of a wireless network includes a cellular wireless network in which mobile wireless devices access and communicate over the cellular wireless network through network service providers. Such network service providers typically implement data plans having monetary charges for use of the cellular wireless network through the network service providers.

Server 505 can engage in a directed transmission with data hub server 502 and server 525 can engage in a directed transmission with data hub server 502 via network 520. Network 520 may be configured as a set of networks such that server 505 communicates with data hub server 502 over a network different from that over which server 525 communicates with data hub server 502. By directed transmission of two servers (server 505 with data hub server 502 and server 525 with data hub server 502), it is meant that the two servers establish communication with each other such that the two servers are parties to the transmission rather than being effectively only passive relays. The transmission over network 520 can be set up as a secure tunnel between data hub server 504 and server 505 and as a secure tunnel between data hub server 504 and server 525. Network 520 can be a local area network, a wide area network, or combinations thereof. In various embodiments, network 520 is a network of interconnected computer networks that interchange data using a standardized protocol. The Internet is an example of such a network.

In various communication sessions with data hub server 504, servers 505 and 525 may use the Internet as network 520. Using directed transmission, such as through the Internet, the transfer process can be streamlined. This streamlining mechanism allows the sharing of informational content to be completed without the content transfer using cellular wireless transferal by a service provider, e-mail transferal, or Bluetooth transferal. Bluetooth transferal is only available when both parties are available and in close proximity. Email transferal includes application of a user's data plan and may include performing the download at a time that may not be convenient.

The capability of directed transmission between data hub server 502 and server 505 or server 525 or both server 505 and server 525, along with the share registration relationship of mobile electronic device 510 with server 505 and mobile electronic device 530 with server 525, provides an efficient mechanism for managing the sharing of informational content between mobile electronic device 510 and mobile electronic device 530. Such management can include selecting the appropriate network over which communications are conducted with data hub server 502 among mobile electronic devices 510 and 530 to access data marked public in data hub server 502. The selection can be made such that transfer of the informational content among mobile electronic devices 510 and 530 can be performed without incurring over-the-air costs associated with wireless network providers. Data transferal between mobile electronic devices using transferal between their corresponding servers and a data hub server can use a communication medium that has periodic flat rate costs, such as flat rate monthly charges to access the Internet. The use of such a communication medium allows for the avoidance of relatively expensive data plan charges of wireless service providers.

In various embodiments, a group of users of mobile wireless devices arranged as clients on different wireless servers can view in a data hub server, such as data hub server 502, data made public to the group in the data hub server. In addition, each of these users of mobile wireless devices can make data public to one or more of the other users in the data hub server. The data hub server can be arranged to register users associated with different wireless servers as having permission to view informational content supplied by other registered users. The registration can be realized as the registration of the mobile wireless devices of the users. A user having multiple mobile wireless devices can have multiple registrations in the data hub server, one for each mobile wireless device. The registration may be further based on the user or the mobile wireless device of the user having a share registration with a wireless server through which data hub server can communicate and transfer data. A mobile wireless device having a share registration in multiple wireless servers may have multiple registrations stored in a database in the data hub server with respect to the public status of informational content in the data hub server.

The data hub server can be constructed as a server external to the wireless servers in which mobile wireless devices have a share registration as clients of the wireless servers. In the data hub server, individual information content can be marked in the database of the data hub server with respect to accessing users or wireless mobile devices of the users on an individual basis. For example, in a group of users registered in the data hub server, a particular individual file from a specified source may be marked as public to some of the group and not marked public for others in the group. If the individual file is partitioned into sections, sections of the file may be marked public for a user and other sections may not be marked public for the same user.

In various embodiments, with respect to users of wireless servers that are operably in communication with a data hub server, the data hub server can be configured to operate having a number of types of functionality. The functionality includes, but is not limited to, the ability to allow a user of a wireless server to upload specific data to the data hub server that the user identifies as being available to other users, the ability for a user of a wireless server to register for content from another wireless server, the ability for the user of a wireless server to allow or deny registration attempts by external users to content provided by the user via the data hub server, the ability to setup transfer quotas so that a maximum amount of data can be uploaded from a wireless server within a specific timeframe, the ability to temporarily store data in a cache on the data hub such that, if another user from another wireless server initiates activity to make the same content public, transfer of the content existing in the cache can be avoided. The users of the different wireless servers can have a share registration with their associated wireless server. Such registrations may be realized as registrations of mobile wireless devices of the users as clients of their associated wireless servers.

Consider the following example embodiment using the example devices of FIG. 5, where mobile electronic devices 510 and 530 are mobile wireless devices and servers 505 and 525 are wireless servers. A set of movie clips, which are a non-limiting example of informational content, are generated in mobile electronic device 510. The set of movie clips are marked as public in mobile electronic device 510 by the user of mobile electronic device 510. The marking of the content as public can include identifying other users that have registered in data hub server 502 for content from the user of mobile electronic device 510 or from mobile electronic device 510. For example, one or more users of server 525 can be registered in data hub server 502 with permission to access informational content sourced from the user of mobile electronic device 510 or from mobile electronic device 510. A user of server 525 may be identified by the mobile electronic device of the user, such as mobile electronic device 530.

The movie clips are transferred from mobile electronic device 510 to server 505. The user of mobile electronic device 510, mobile electronic device 510, or both may have a share registration in server 505. The transfer may be conducted over an appropriate Wi-Fi network when mobile electronic device 510 is in range of the Wi-Fi network at a time following the identification of the movie clips to be made public. The communications can be established using conventional processes for establishing Wi-Fi communication. The movie clips can be transferred from the Wi-Fi network to server 505 via the Internet. If server 505 is in range of the Wi-Fi network, the transfer of the movie clips can be transferred directly in the Wi-Fi network without use of the Internet. The transfer can be directed by the user of mobile electronic device 510. Alternatively, once the information content is marked as public for a set of users, the transfer can be autonomously conducted by mobile electronic device 510 through the interaction of its Wi-Fi interfaces for communicating on a detected Wi-Fi network. Parameters in mobile electronic device 510 can be set to communicate over a specific secure Wi-Fi network. Parameters also may be set in server 505 to communicate over a specific secure Wi-Fi network.

The transfer of the movie clips can be conducted between mobile electronic device 510 and server 505 using a universal serial bus (USB) connection. USB is a serial bus standard to interface devices. A USB connection, for example, can interface a device with a computer. A USB mechanism can be realized as a wired connection or as a wireless connection over relatively short distances. Similar to a Wi-Fi transfer, the movie clips transferred by USB connection avoid the use of a wireless network through a wireless server provider. Optionally, user of mobile electronic device 510 can transfer the movie clips to server 505 using a cellular wireless network. Various parameters can be set in mobile electronic device 510 for mobile electronic device 510 to automatically send the movie clips directed to server 505 over an appropriate mode of transmission at an appropriate time.

Upon receipt of the movie clips in server 505, the status as to public or non-public is checked in server 505. The determination of which users have access to the movie clips can have been made in data hub server 502 previous to the reception of the movie clips in server 505. In such a case, server 505 pushes out the movie clips to data hub server 502 in appropriate format for transmission upon checking and determining the public status. The transmission of the movie clips from server 505 to data hub server 502 can be conducted over the Internet. For the situation in which the user of mobile electronic device 510 specifies the users to have public access to the movie clips or partial public access to the movie clips, mobile electronic device 510 passes to server 505 the identification of those users that are designated as having public or partial public access to the movie clips. Server 505 also sends these identifications to data hub server 502. Partial public access includes making less than all of the movie clips public to one or more users.

A user registered in data hub server 502 as having permission to access informational content from specified users can check the availability of new informational content marked as public for the user. The user can be registered in data hub server 502 by registration of the user's mobile electronic device, such as mobile electronic device 530. Alternatively, the can be registered in data hub server 502 by registration of the user or the user's mobile electronic device in a server, such as server 505. The registration in data hub server 505 to view informational content includes an indicator of a correspondence between a user accessing the informational content and a user that sources (makes available) the informational content. Since the user of mobile electronic device 530 is registered as a user that is allowed to access informational content sourced by the user of mobile electronic device 510, the user of mobile electronic device 530 can view that there are movie clips available from the user of mobile electronic device 510. The view or determination that the movie clips are available is generated via server 525 communicating the data hub server 502.

The user of mobile electronic device 530 can generate a request to download one or more of the movie clips to mobile electronic device 530. The request initiated in mobile electronic device 530 is transmitted to server 525. The request, which is of limited data size, can be sent via a cellular wireless network to server 525. Upon receiving the request, server 525 sends a request to data hub server 502 to transfer the movie clip or clips specified in the request to server 525. Transmittal of the request from server 525 to data hub server 502 can be accomplished by passing through the request from mobile electronic device 530 or by reformatting the request. The reformatted request can include an identification of the requesting party, where the identification is correlated to the registration information in data hub server 502.

In response to receiving a request for one or more movie clips in data hub server 502, data hub server 502 can verify the public status of the requesting party stored in its database. Then, one or more movie clips in data hub server 502 are transmitted from data hub server 502 to server 525 over the Internet.

The movie clip or clips are received at an Internet interface of server 525. With the request for the movie clip or clips maintained in server 525, a setting in server 525 automatically initiates the transfer of the movie clips to mobile electronic device 530 upon mobile electronic device 530 entering Wi-Fi range of server 505. If mobile electronic device 530 is not in the Wi-Fi range of server 505, a message can be sent to mobile electronic device 530 from server 525 regarding the acquisition of the movie clip or clips is server 525. This message, which can be of limited data size, may be sent over a cellular wireless network from server 525 to mobile electronic device 530. Alternatively, when the movie clip or clips are received at an Internet interface of server 525, a process in server 525 can autonomously be conducted to generate a notice of the arrival of the movie clip or clips with further action based on a response received from mobile electronic device 530.

Upon arrival of the requested movie clip or clips at mobile electronic device 530, the requested movie clip or clips are appropriately categorized and stored in mobile electronic device 530. A notification of the arrival of the requested movie clip or clips can be generated in mobile electronic device 530 to inform the user of mobile electronic device 530. The notification may be in the form of an audible tone, music, notification of a message, or a call to a Bluetooth device corresponding to mobile electronic device 530 with an appropriate message.

The provision as public and the transfer of the movie clips to data hub server 502 and the transfer of the movie clips from data hub server 302 can be conducted without sending the movie clips over-the-air. Such an Internet-based transfer process from mobile electronic device 510 to movie electronic device 530 creates an alternative to sending informational content directly between mobile electronic devices over-the-air, which provides a cost reduction considering the higher cost of sending data over-the-air as compared to sending data over a combination of Internet and a Wi-Fi connection, for example. In various embodiments, the mode of transmission of the informational content can be selected to attain the lowest cost at the time of transmission among the modes of transmission available in the devices used in the transmission.

A user of a mobile electronic device can configure rules in the mobile electronic device for using transmission channels such that the user can control the level of cost efficiency vs. convenience. In addition, using servers, in connection with a data hub server, to manage the transfer of informational content between mobile electronic client devices can reduce the processing on the mobile electronic client devices with respect to the administration aspects of the data transmission and extend the battery life of the mobile electronic client devices.

In various embodiments, each mobile electronic device is configured as a mobile wireless client having a share registration with its respective wireless server. The example architecture of FIG. 5 provides for efficient transfer of informational among such mobile wireless clients of different wireless servers without the mobile wireless clients having a share registration in the same wireless server. The arrangement of data hub server 502 with wireless server 505/mobile wireless device 510 and with wireless server 525/mobile wireless device 530 also permits sharing of informational content between mobile wireless device 510 and mobile wireless device 530 without servers 505 and 525 specifically networked together with corresponding security/access configurations and privileges. Alternatively, servers 505 and 525 can be specifically networked together with corresponding security/access configurations and privileges.

Figure 6:
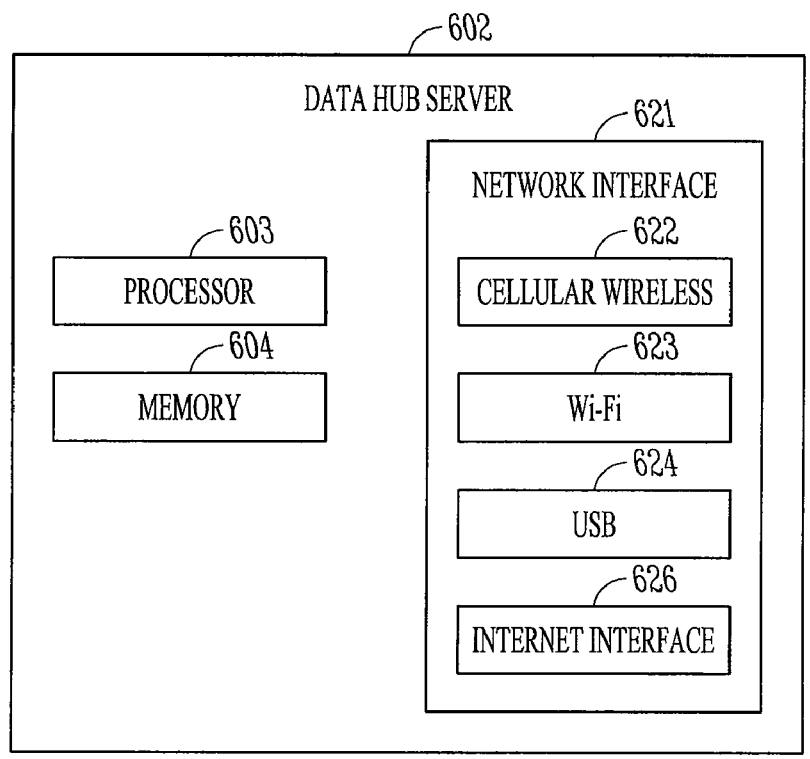
FIG. 6 shows a block diagram of features of an embodiment of a data hub server that can be used in architectures similar to the architecture of FIG. 5, according to various embodiments.

FIG. 6 shows a block diagram of features of an embodiment of a data hub server 602 that can be used in architectures similar to the architecture of FIGS. 4A and 4B and architecture 500 of FIG. 5. Server 602 can include one or more processors 603, memory 604 operatively coupled to one or more processors 603, and a network interface 621. Memory 604 can be configured to store instructions to engage in sharing informational content between a server from which the informational content is sourced and a server requesting access to the informational content, where the informational content is identified as being public in data hub server 602 to those entities registered in data hub server 602 as having permission to access the informational content. Memory 604 can be configured to store parameters associated with the instructions including an indicator for each correlation of a specific informational content as being public or partially public to a registered entity.

Memory 604 can be arranged as a database. The database can be configured as a distributed database within data hub server 603. The database may be queried and operated using structured query language (SQL). Other query and store mechanisms may be implemented. Memory 604 is a form of machine-readable medium that stores instructions. Memory 604 is not limited to any type of machine-readable medium. Memory 604 can be a computer-readable medium with data hub server 602 integrated into a computer.

Registration of a user in data hub server 602 can include storing in data hub server 602 one or more of a user identification, an identification of a mobile electronic device, entities to which the user has a public sharing relationship, entities to which a mobile electronic device has a public sharing relationship, the server in which the user is registered, the server in which the mobile electronic device is registered as a client, or various combinations thereof. Correlation of a public status between two entities can also include a password or other secure identification stored in data hub server 602 to relate the two entities in data hub server 602.

Network interface 621 is arranged to operatively couple to a network to implement at least directed transmission with servers that are associated with the sourcing of informational content and with servers that are associated with requesting the informational content from data hub server 602. Network interface 621 can be configured with an Internet interface 626 operable with the Internet to conduct directed transmission to and from multiple sourcing and accessing servers. Internet interface 626 can be configured as an interface to conduct communications over other networks of interconnected computer that interchange data using a standardized protocol. Internet interface 626 can include an Ethernet connection. Network interface 621 may optionally include one or more of a cellular wireless interface 622, a Wi-Fi interface 623, and a USB interface 626.

In various embodiments, data hub server 602 includes a machine-readable medium, such a memory 604, that stores instructions, which when performed by data hub server 602, cause data hub server 602 to receive, from a server, an indication of informational content as being public or partially public to a group, the group being registered in data hub server 602 as having permission to access data specified as public with respect to an association with a mobile electronic client of the server; to mark a setting in data hub server 602 representing the informational content as being public or partially public to the group; and to transmit, to the another server, a representation of the informational content as being public or partially public to a mobile electronic client of the other server. In addition, data hub server 602 includes a machine-readable medium, such as memory 604, that stores instructions, which when performed by data hub server 605 causes data hub server 602 to perform operations that include managing the storage of parameters of multiple sourcing entities and multiple accessing entities with respect to registration for public access and with respect to the transfer of informational content marked in data hub server 605 as being public.

Figure 7:
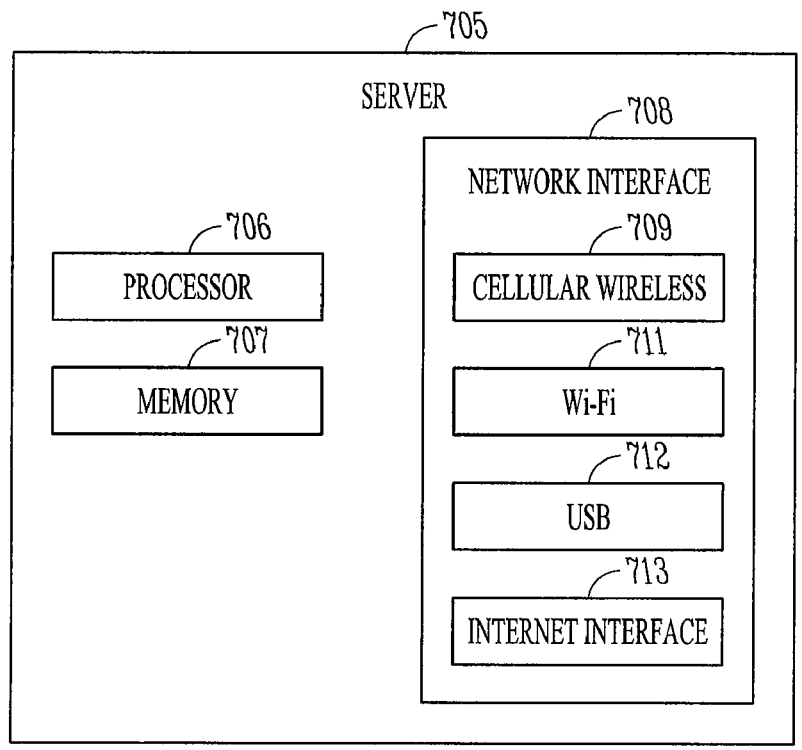
FIG. 7 shows a block diagram of features of an embodiment of a server that can be used in architectures similar to the architecture of FIGS. 4A and 4B and the architecture of FIG. 5, according to various embodiments.

FIG. 7 shows a block diagram of features of an embodiment of a server 705 that can be used in architectures similar to the architecture of FIGS. 4A and 4B and architecture 500 of FIG. 5. Server 705 can include one or more processors 706, memory 707 responsive to the one or more processors 706, and a network interface 708. Memory 707 is a form of machine-readable medium that stores instructions. Memory 707 can be arranged as a database. The database can be configured as a distributed database within server 705. The database may be queried and operated using structured query language (SQL). Other query and store mechanisms may be implemented. Memory 707 is not limited to any type of machine-readable medium. Memory 707 can be a computer-readable medium with server 705 integrated into a computer. Memory 707 and processor(s) 706 can be arranged such that server 705 can be configured to operate as a sourcing server and as an accessing server.

Memory 707 can be arranged to store instructions to engage in sharing informational content with another server using a data hub server that acts as a go-between server to facilitate transfer of the informational content marked as public in the data hub server relative to an association of the other server. The informational content can be entered into server 705 for a mobile electronic device that is registered in server 705 as a client of server 705. Memory 707 includes instructions to receive informational content from a mobile electronic device and to enter into communications with a data hub server to make the informational content available in the data hub server with a public status. The public status being dependent on an entity or entities registered to access data having the public status. Such entities can include a user of another server or a mobile electronic device of the user that is registered as a client in another server. The entities can include multiple users or multiple electronic devices in multiple servers.

Memory 707 can also be arranged to store instructions to engage in accessing informational content from another server using a data hub server that acts as a go-between server to facilitate transfer of the informational content marked as public in the data hub server to server 705 relative to the other server. The instructions can include storage of parameters to register server 705, a user of server 705, a mobile electronic client of server 705, or combinations thereof in the data hub server as having permission to access informational content from one or more entities. The informational content can be marked in the data hub server as public with respect to register server 705, a user of server 705, a mobile electronic client of server 705, or combinations thereof. The instructions also can include instructions to operatively communicate with the data hub server to establish security protocols for accessing the informational content marked public, including, but not limited to, establishing a password for an entity to access the informational content in the data hub server.

Network interface 708 can be arranged to operatively couple to a network to implement at least directed transmission with a data hub server as a sourcing server of informational content or as an accessing server of informational content or both a sourcing and accessing server. Network interface 708 can be configured with Internet interface 713 to be operable with the Internet to conduct directed transmission to and from a data hub server. Internet interface 713 can be arranged as an interface to conduct communications over a network of interconnected computer that interchange data using a standardized protocol. Internet interface 713 can include an Ethernet connection. Network interface 708 can include a cellular wireless interface 709, a Wi-Fi interface 711, and a USB interface 712.

In various embodiments, server 705 includes a machine-readable medium, such as memory 707, that stores instructions, which when performed by server 705, cause server 705 to operate as a sourcing server. The instructions can include instructions to receive, in server 705 from a mobile electronic client of server 705, an identification of informational content to be made public and an identification of a group, with the group being registered in a data hub server as having permission to access data specified as public with respect to an association with the mobile electronic client of server 705. The instructions can include instructions to transmit, from server 705 to the data hub server, an indication of the informational content as being public to the group.

In various embodiments, server 705 includes a machine-readable medium, such as memory 707, that stores instructions, which when performed by server 705, cause server 705 to operate as an accessing server. The instructions can include instructions to receive, in server 705 from a data hub server, a representation of the informational content. The instructions can include instructions to generate a notice to a mobile electronic client of server 705, where the notice indicates availability of the informational content for download to the mobile electronic client of server 705.

Figure 8:
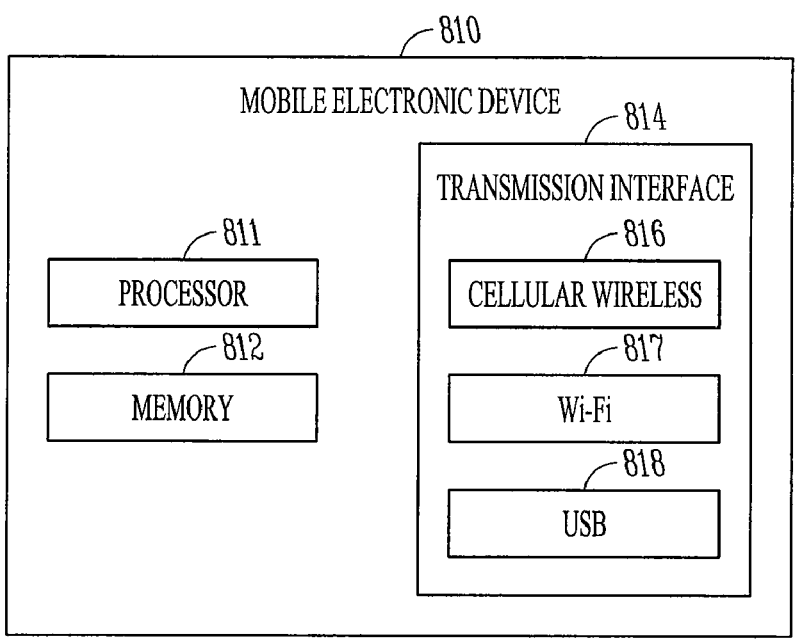
FIG. 8 shows a block diagram of features of an embodiment of a mobile electronic that can be used in architectures similar to the architecture of FIGS. 4A and 4B and the architecture of FIG. 5, according to various embodiments.

FIG. 8 shows a block diagram of features of an embodiment of a mobile electronic 810 that can be used in architectures similar to the architecture of FIGS. 4A and 4B and architecture 500 of FIG. 5. Mobile electronic device 810 can include one or more processors 811, memory 812 responsive to the one or more processors 811, and a transmission interface 814. Transmission interface 814 can be arranged to communicate over various mediums. Transmission interface 814 can include a cellular wireless interface 816, a Wi-Fi interface 817, and USB interface 818. Selection of the transmission medium can be realized to transfer informational medium to and from a server based on parameters and instructions stored in memory 812.

Memory 812 is a form of machine-readable medium that stores instructions to manage operation of mobile electronic device 810. Memory 812 can be arranged as a database. The database can be configured as a distributed database within mobile electronic device 810. The database may be queried and operated using structured query language (SQL). Other query and store mechanisms may be implemented. Memory 812 is not limited to any type of machine-readable medium. Memory 812 can be a computer-readable medium.

Memory 812 and processor(s) 811 can be arranged to operate mobile electronic device 810 as a mobile electronic device that initiates sourcing of informational content for sharing with another mobile electronic device using a data hub server. Memory 812 and processor(s) 811 can be arranged to operate mobile electronic device 810 as a mobile electronic device that is registered in a data hub server to access informational content marked as public in the data hub server relative to an entity that establishes the public status of the informational content.

In various embodiments, mobile electronic device 810 includes a machine-readable medium, such as memory 812, that stores instructions, which when performed by mobile electronic device 810, cause mobile electronic device 810 to operate as a mobile electronic device that initiates transfer of informational content to another mobile electronic device via a data hub server. The instructions can include instructions to correlate informational content to a status as being public or partially public to a group, with the group being registered in the data hub server as having permission to access data specified as public with respect to an association with mobile electronic device 810. The instructions can include instructions to transmit an identification of the informational content from mobile electronic device 810 to a server in which mobile electronic device 810 is registered as a client.

In addition, mobile electronic device 810 can include a machine-readable medium, such as memory 812, that stores instructions, which when performed by mobile electronic device 810, cause mobile electronic device 810 to operate as a mobile electronic device that is the recipient of informational content marked as public in a data hub server. The public status can be limited to entities registered in the data hub server as having permission to access data marked public with respect to a specific source of the informational content. The instructions can include instructions to receive a representation of informational content that is available for download to mobile electronic device 810 from a server that accesses the informational content from a data hub server, where mobile electronic device 810 is a client of the server that interacts with the data hub server.

Figure 9:
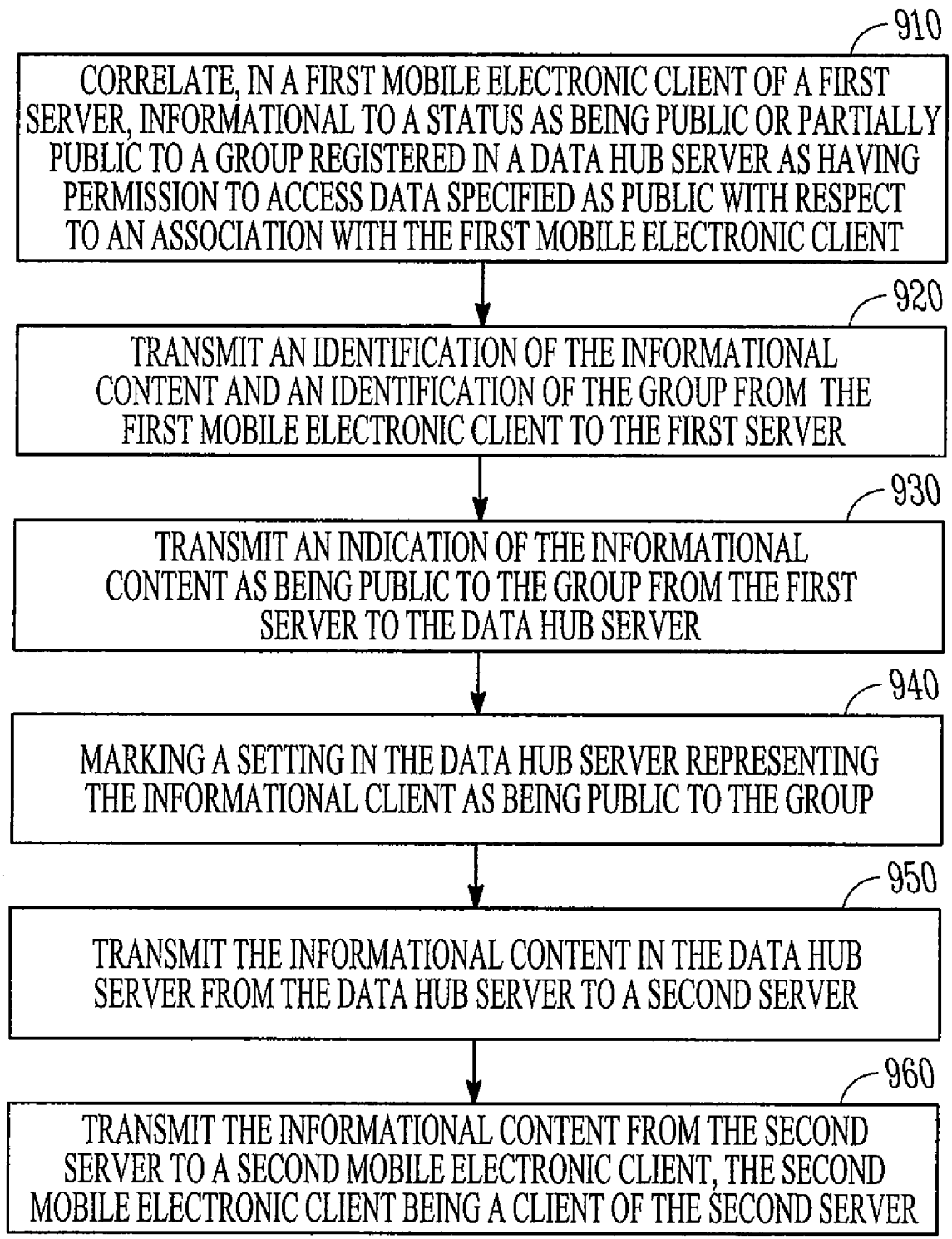
FIG. 9 illustrates features of a method for sharing informational content between two mobile electronic devices using a data hub server, according to various embodiments.

FIG. 9 illustrates features of a method for sharing informational content between two mobile electronic devices using a data hub server, according to various embodiments. At 910, in a first mobile electronic device registered as a client of a first server, informational content is correlated to a status as being public or partially public to a group. The group can be registered in a data hub server as having permission to access data specified as public with respect to an association with the first mobile electronic client. The first mobile electronic client can be registered as client of the first server having a share relationship with one or more other mobile electronic clients of the first server. The first mobile electronic client can be configured as a wireless client of the first server with the first server configured as a wireless server.

The informational content can be selected in the first mobile electronic device for transfer to a second mobile electronic device. The selection of informational content can include select of informational content that resides on the first mobile electronic device. Alternatively, the selection of informational content can include selection of informational content that resides on the first server in which the first mobile electronic device is registered. Selection of informational content in the first server can be realized by browsing the first server from the first mobile electronic device and selecting the informational content in the first server. Browsing the first server by the first mobile electronic device can be conducted over a cellular wireless network, over a Wi-Fi network, or by a USB connection. The selection of the informational content in the first server can also be recorded in the first mobile electronic device.

At 920, an identification of the informational content and an identification of the group are transmitted from the first mobile electronic client to the first server. The identification of the informational content can be used to mark the informational content residing on the first server as being selected to be made public. The identification of the informational content can be conducted by transmitting the informational content from the first mobile electronic client to the first server including a specific name or identity for the informational content. The transmission of the information content can be conducted over a Wi-Fi network or by a USB connection. The identification of the group can include identification of individual users of the informational content to be made public. The identification of the group can include identification of individual mobile electronic devices to which access of the informational content is permitted in the data hub server through a server in which the individual mobile electronic devices are registered. The identification of individual mobile electronic devices may include the identification of specific servers through the mobile electronic devices respectively access the data hub server.

At 930, an indication of the informational content as being public to the group is transmitted from the first server to the data hub server. The transmission of the indication can be accompanied by transmission of the informational content form the first server to the data hub server. The transmission can be conducted over a network, such as the Internet, of interconnected computer networks that interchange data using a standardized protocol. The transmission can be conducted over a secure channel between the first server and the data hub server. Alternatively, with the informational content residing in the data hub server, transmission of the informational content to the data hub server can be avoided with the transmission limited to the identification of the informational content to be made public and data specifying the entities having permission to access the informational content.

At 940, a setting in the data hub server is marked representing the informational content as being public to the group. The setting can be made in a database of the data hub server correlating the informational content with the source of the informational content and the set of entities permitted to access the informational content. An indicator of the permission can include an indicator of permission granted from the source of the informational content. In an addition, indicators of the permission can include an indicator of the registration of an entity in the data hub server. An item of informational content in the database of the data hub server can have multiple record entries. For example, informational content A can be correlated with source B and accessing entity C in the database. In addition, informational content A can be correlated with source D and accessing entity E in the database.

At 950, the informational content in the data hub server is transmitted from data hub server to a second server. The transmission can be conducted over a secure channel between the data hub server and the second server. The informational content can be transmitted from data hub server to a second server over a network, such as the Internet, of interconnected computer networks that interchange data using a standardized protocol. The second server can be registered as having permission to access the informational content in the data hub server. Users of the second server can be registered as having permission to access the informational content in the data hub server. Mobile electronic devices of users of the second server can be registered as having permission to access the informational content in the data hub server.

At 960, the informational content is transmitted from the second server to a second mobile electronic client, where the second mobile electronic client is a client of the second server. The transmission of the information content can be conducted over a Wi-Fi network or by a USB connection. The informational content can be transmitted to the second mobile electronic client after notification of the arrival of the informational content in the second server is sent to the second mobile electronic client and a request to download the informational content is received in the second server from the second mobile electronic client in response to the notification. Alternatively, based on a profile in the second server for the second mobile electronic client, the informational content can be automatically downloaded to the second mobile electronic client at the occurrence of a specified event or time. The second mobile electronic client can be configured as a wireless client of the second server with the second server configured as a wireless server.

Figure 10:
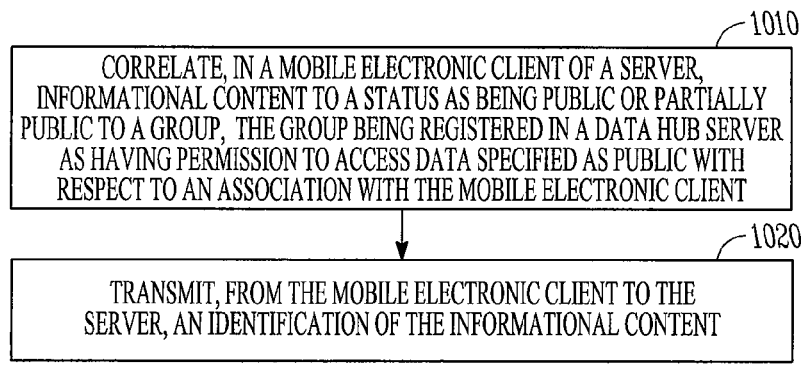
FIG. 10 illustrates features of a method for initiating in a mobile electronic device the sharing of informational content with another mobile electronic device using a data hub server, according to various embodiments.

FIG. 10 illustrates features of a method for initiating in a mobile electronic device the sharing of informational content with another mobile electronic device using a data hub server, according to various embodiments. The mobile electronic device can be registered as a client in a server and the other mobile electronic device can be registered as a client in another server. In various embodiments, the mobile electronic devices are configured as mobile wireless clients registered in their respective wireless servers.

At 1010, in a mobile electronic client of a server, informational content is correlated to a status as being public or partially public to a group. The group can be registered in a data hub server as having permission to access data specified as public with respect to an association with the mobile electronic client. The registration of the group in a database of the data hub server may be conducted prior to selecting, in the mobile electronic client, the informational content to be made public. Alternatively, the correlation of the informational content to a public status of group in the mobile electronic client can initiate a process for registering the group as having permission to access the informational content in the data hub server. The registration can be facilitated with further processing of the informational content for the group or in a separate process for registering the identified group. The process for registering the group can include establishing passwords or other security measures relative to a public status between the mobile electronic client and individual entities of the group.

At 1020, an identification of the informational content is transmitted from the mobile electronic client to the server in which the mobile electronic client is registered. In response to receiving the identification of the informational content from the mobile electronic client, a process in the server can be automatically initiated to determine if the informational content resides on the server. If the informational content resides on the server, notification of this presence of the informational content can be transmitted to the mobile electronic client, which in response can update its database as to the presence of the informational content on the server. In addition to the identification of the informational content, the mobile electronic client can communicate, to the server, the public status of the informational content and the entities to which the public status is generated.

The mobile electronic client can transmit selected informational content to the server from a Wi-Fi interface on the mobile electronic client. Alternatively, the electronic client can transmit the selected informational content to the server from a USB interface on the mobile electronic client. Size-limited data regarding the identity of the selected informational content, the public sharing status assigned to the selected informational content, the entities associated with a public or partially public status, parameters for sharing the informational content through the data hub server, or various combinations thereof can optionally be transmitted over a cellular wireless network. Parameters of a profile stored in the mobile electronic client can be accessed to determine the different transmission mediums utilized in communicating with the server.

The various operations performed by the mobile electronic device can be performed by execution of instructions stored in a machine-readable medium. The machine-readable medium can also store parameters used in execution of the instructions and can also store results from execution of the instructions. The form of machine-readable medium is not limited to any one type of machine-readable medium, but can be any machine-readable medium that can be implemented in a mobile electronic device. Such a mobile electronic device can be configured similar to the mobile electronic devices discussed with respect to of FIGS. 1-5 and 6-15.

Figure 11:
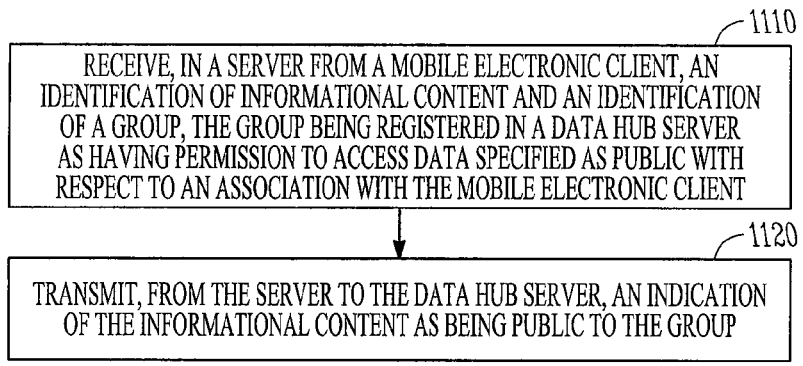
FIG. 11 illustrates features of a method for operating a server, in which a mobile electronic device is registered as a client, to engage in the sharing of informational content between the mobile electronic device and another mobile electronic device using a data hub server, according to various embodiments.

FIG. 11 features of a method for operating a server, in which a mobile electronic device is registered as a client, to engage in the sharing of informational content between the mobile electronic device and another mobile electronic device using a data hub server, according to various embodiments. The mobile electronic device can be registered as a client in the server and the other mobile electronic device can be registered as a client in another server. In various embodiments, the mobile electronic devices are configured as mobile wireless clients registered in their respective wireless servers.

At 1110, an identification of informational content and an identification of a group are received in a server from a mobile electronic client. The group can be registered in a data hub server as having permission to access data specified as public with respect to an association with the mobile electronic client. The identification of informational content can be received as a message in the server from its mobile electronic client or as the result of a browsing activity in the server directed from its mobile electronic client. The identification of the group can be received as a message in the server from its mobile electronic client or as the result of a search query of a database in the server directed from its mobile electronic client.

The database can include identities of entities permitted to access content relative to clients registered in the server. The database can include information associated with each entity relative to its status to access content marked public in the data hub server. Each of various clients registered in the server can have associated group members and effective ownership of informational content different from the other clients registered in the server. There can be overlapping content and groups among the various clients registered in the server. Rather than store multiple copies of the same informational content associated with different clients, the server can store one copy of the informational content and maintained parameters in its database to identify the mobile electronic clients associated with this informational content and the characteristics correlated to the informational content for each such client.

If the informational content does not reside on the server, the server can receive the informational content from the mobile electronic client at a Wi-Fi interface of the server. Alternatively, the server can receive the informational content from the mobile electronic client at a USB interface of the server. Size-limited data regarding the identity of the selected informational content, the public sharing status assigned to the selected informational content, the entities associated with a public or partially public status, parameters for sharing the informational content through the data hub server, or various combinations thereof can be received over a cellular wireless network.

At 1120, an indication of the informational content as being public to the group is transmitted from the server to the data hub server. The indication of the informational content can be sent to the data hub server as part of a communication process with the data hub server to determine if the data hub server currently stores the informational content. If the data hub server currently stores the informational content, the identification of those entities permitted to access the informational content in the data hub server can be sent to the data hub server. In various embodiments, the establishment of entities, as being permitted to access informational content marked public in the data hub server relative to a specified user or specified mobile electronic client of the server, can be conducted separate from specifying the informational content to be made public. In such instances, sending the identification of the informational content to the data hub server identifies the group for which the information content is made public without sending an identification of the group with the identification of the informational content.

Alternatively, the informational content can be sent from the server to the data hub server including the identity of the informational content. The informational content can be sent from a network interface of the server to the data hub server over a network of interconnected computer networks that interchange data using a standardized protocol. The network used may be the Internet. In instances where the data hub server includes a predefined group registered with permission to access informational content made public relative to a specified user or specified mobile electronic client of the server, sending the informational content to the data hub server identifies the group for which the information content is made public without sending an identification of the group.

The various operations performed by the server can be performed by execution of instructions stored in a machine-readable medium. The machine-readable medium can also store parameters used in execution of the instructions and can also store results from execution of the instructions. The form of machine-readable medium is not limited to any one type of machine-readable medium, but can be any machine-readable medium that can be implemented in a server. Such a server can be configured similar to the servers discussed with respect to of FIGS. 1-5, 7, and 7-15.

Figure 12:
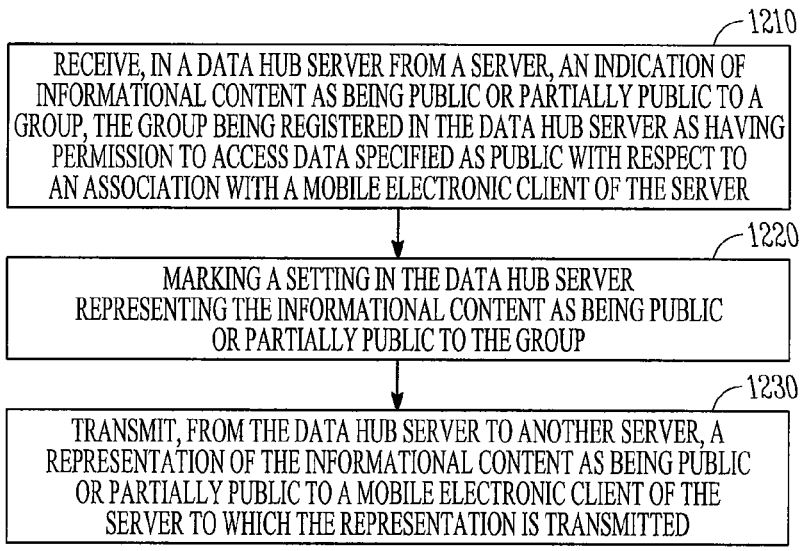
FIG. 12 illustrates features of a method for operating a data hub server to engage in the sharing of informational content between two mobile electronic devices, according to various embodiments.

FIG. 12 illustrates features of a method for operating a data hub server to engage in the sharing of informational content between two mobile electronic devices, according to various embodiments. The mobile electronic devices can be registered as clients in different servers. In various embodiments, the mobile electronic devices are configured as mobile wireless clients registered in their respective wireless servers.

At 1210, an indication of informational content as being public or partially public to a group is received in a data hub server from a server. The group can be registered in the data hub server as having permission to access data specified as public with respect to an association with a mobile electronic client of the server. If the informational content does not reside on the data hub server, a communication can be autonomously transmitted from the data server to the server from which the informational content was received, where the communication notifies that the server of the absence of the informational content in the data hub server. Subsequently, the informational content can be received in the data hub server from the server. Alternatively, the indication of informational content as being public or partially public to a group is received in a data hub server from a server in a communication session in which the informational content is received in the data hub server from the server. The informational content can be received at a network interface of the data hub server from a network, such as the Internet, of interconnected computer networks that interchange data using a standardized protocol.

At 1220, a setting is marked in the data hub server representing the informational content as being public or partially public to the group. The data hub server can store this indication and the identity of the group in a database of the data hub server correlated with an identity of the source of the informational content. The informational content may be correlated to various sources in the database of the data hub server. Each correlation of informational content with a specific source can also be correlated with a set of entities having permission to access the informational content as public relative to the correlation of the source with the set of entities.

At 1230, a representation of the informational content is transmitted from the data hub server to another server, where the informational content is identified as being public or partially public to a mobile electronic client of the server to which the representation is transmitted. The transmission of a representation of the informational content allows a determination to be made at the receiving server or in a mobile electronic client of the receiving server as to whether the informational content or portions of the informational content should be transferred to the receiving server. Alternatively, the informational content is transmitted from the data hub server to the receiving server as the representation of the informational content. The informational content can be sent from a network interface of the data hub server over a network of interconnected computer networks that interchange data using a standardized protocol. The network accessed can be the Internet.

The various operations performed by the data hub server can be performed by execution of instructions stored in a machine-readable medium. The machine-readable medium can also store parameters used in execution of the instructions and can also store results from execution of the instructions. The form of machine-readable medium is not limited to any one type of machine-readable medium, but can be any machine-readable medium that can be implemented in a data hub server. Such a data hub server can be configured similar to the data hub server discussed with respect to FIGS. 1-6 and 9-15.

Figure 13:
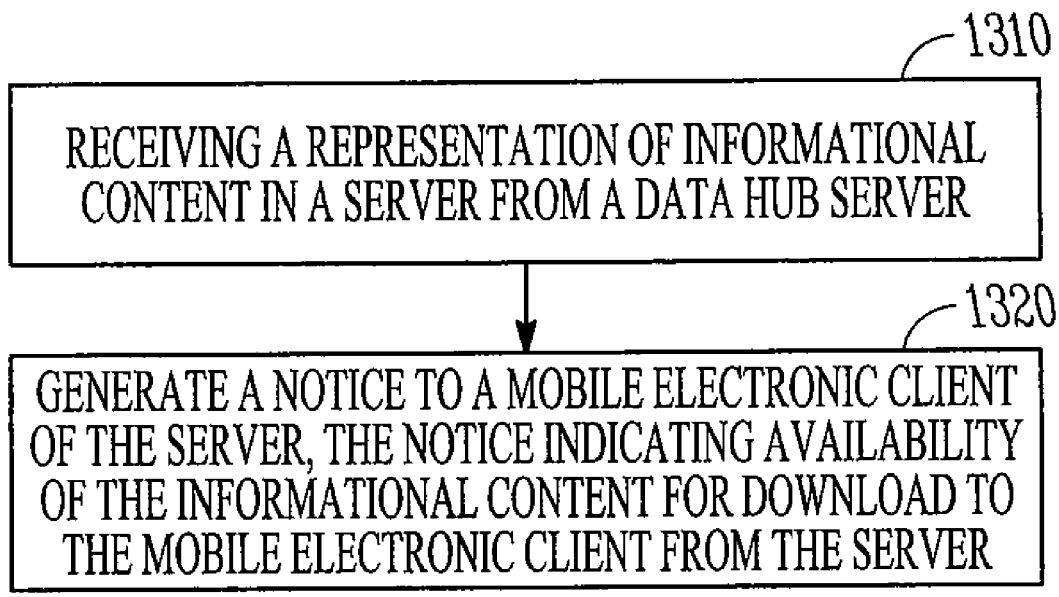
FIG. 13 illustrates for operating a server, in which a mobile electronic device is registered as a client, to engage in the sharing of informational content from another mobile electronic device using a data hub server, according to various embodiments.

FIG. 13 illustrates features of a method for operating a server, in which a mobile electronic device is registered as a client, to engage in the sharing of informational content sourced from another mobile electronic device using a data hub server, according to various embodiments. The mobile electronic devices can be registered as clients in different servers. In various embodiments, the mobile electronic devices are configured as mobile wireless clients registered in their respective wireless servers.

At 1310, a representation of informational content is received in a server from a data hub server. Alternatively, the informational content can be received in the server from the data hub server as the representation of informational content. The informational content can be received at a network interface of the server from a network of interconnected computer networks that interchange data using a standardized protocol. The network can be the Internet.

At 1320, a notice is generated to a mobile electronic client of the server. The notice indicates availability of the informational content for download to the mobile electronic client from the server. A database of the server can be accessed to determine the set of mobile electronic clients that are registered as having permission to access the informational content. The server can generate a communication session with each member of the set of mobile electronic clients to determine whether the informational should be transferred to the server. For multiple members of the set, only a single reception of the informational content in the server from the data hub server may be conducted.

The various operations performed by the server can be performed by execution of instructions stored in a machine-readable medium. The machine-readable medium can also store parameters used in execution of the instructions and can also store results from execution of the instructions. The form of machine-readable medium is not limited to any one type of machine-readable medium, but can be any machine-readable medium that can be implemented in a server. Such a server can be configured similar to the servers discussed with respect to FIGS. 1-5, 7, and 9-15.

Figure 14:
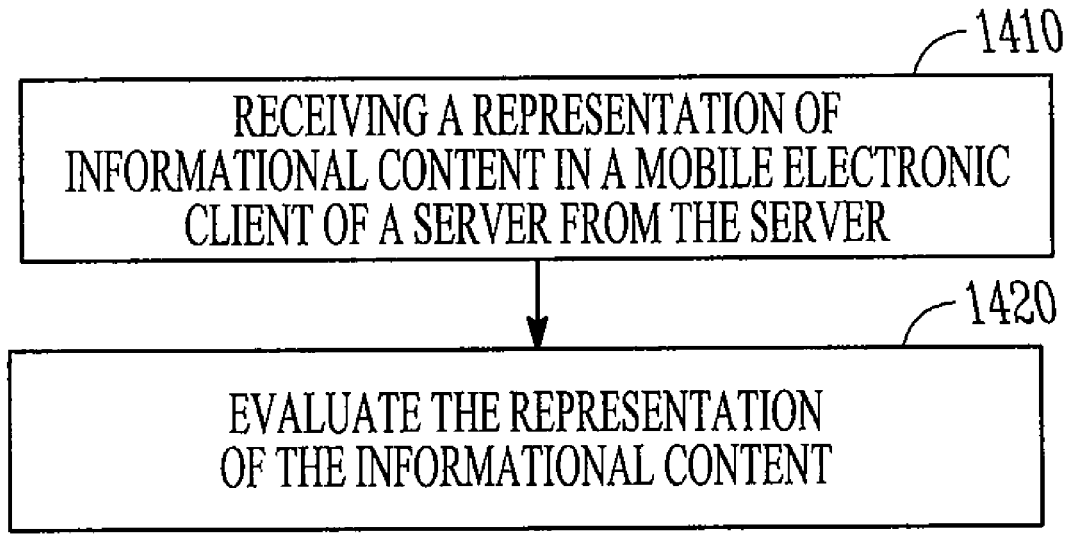
FIG. 14 illustrates features of a method for receiving access in a mobile electronic device to informational content shared from another mobile electronic device using a data hub server, according to various embodiments.

FIG. 14 illustrates features of a method for receiving, in a mobile electronic device, access to informational content shared from another mobile electronic device using a data hub server, according to various embodiments. The mobile electronic devices can be registered as clients in different servers. In various embodiments, the mobile electronic devices are configured as mobile wireless clients registered in their respective wireless servers.

At 1410, a representation of informational content from a server is received in a mobile electronic client of the server. The received representation can be realized as a small portion of the informational content. The received representation can be a notification from the server that the informational content is available for download to the mobile electronic client. The received representation can include data regarding the name of the informational content, the data size associated with the informational content, playing time of the informational content if the informational content is media content, identities of individuals associated with the informational content, the source of the informational content, other data or parameters associated with the informational content, or various combinations thereof. If the representation of the informational content and associated data is size-limited, such information can be received at an interface of the mobile electronic client from a cellular wireless network. Parameters in a profile stored in the mobile electronic client and in the server, in which the mobile electronic client is registered, can be accessed to determine the different transmission mediums utilized in communicating between the mobile electronic client and the server.

At 1420, the representation of the informational content is evaluated within the mobile electronic client. With data received in the mobile electronic client regarding the informational content, the user of the mobile electronic client can determine whether or not the informational content is to be downloaded to the mobile electronic client. The mobile electronic client can receive the download of the informational content from the server at a Wi-Fi interface on the mobile electronic client. The mobile electronic client can receive the download of the informational content from the server at a USB interface on the mobile electronic client. Optionally, the mobile electronic client can receive the download of the informational content from the server at an interface of the mobile electronic client from a cellular wireless network. Parameters in a profile stored in the mobile electronic client and in the server, in which the mobile electronic client is registered, can be accessed to determine the different transmission mediums utilized in downloading the informational content to the mobile electronic client from the server.

In addition, the user of the mobile electronic client can set the time for download. The download from the server can be initiated upon selection of a download activity on a display of a user interface of the mobile electronic client. The user can set a future time to initiate download of the informational content to the mobile electronic client from the server. The parameters for downloaded of the informational content to the mobile electronic client can be stored on both the mobile electronic client and the server.

In various embodiments, a user of the mobile electronic client can browse the server and can determine if there is new content marked as public with respect to the user or the mobile electronic client of the user that is available for download. The initiation of the browse activity can be conducted without having previously received a notification in the mobile electronic client of new informational content. Additionally, to determine if there is new content available, the user can generate a request to the server to query a data hub server in which the user or the user's mobile electronic client is registered as having permission to access informational content marked public.

The various operations performed by the mobile electronic device can be performed by execution of instructions stored in a machine-readable medium. The machine-readable medium can also store parameters used in execution of the instructions and can also store results from execution of the instructions. The form of machine-readable medium is not limited to any one type of machine-readable medium, but can be any machine-readable medium that can be implemented in a mobile electronic device. Such a mobile electronic device can be configured similar to the mobile electronic devices discussed with respect to of FIGS. 1-5 and 8-15.

Figure 15:
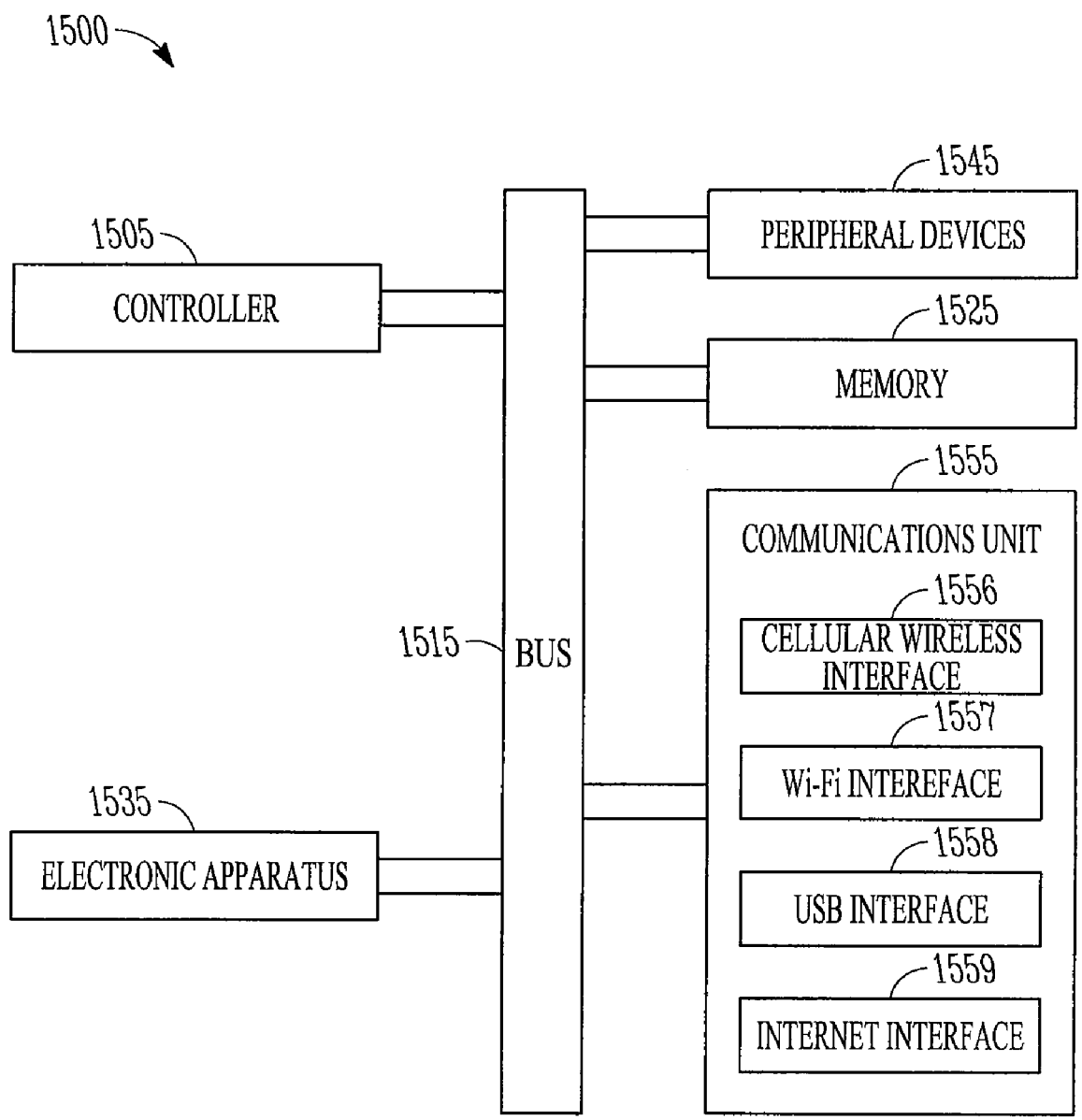
FIG. 15 depicts a diagram of an embodiment of a system having a controller and a memory, according to various embodiments.

FIG. 15 depicts a block diagram of features of an embodiment of a system 1500 having a controller 1505, a memory 1525, and a communications unit 1555. Controller 1505, memory 1525, and communications unit 1555 can be arranged to engage in the transfer of informational content between two mobile electronic devices using directed transmission between two servers. One of the mobile electronic devices can be registered in one of the servers and the other mobile electronic devices can be registered in the other server. Communications unit 1555 can be configured to operate in one or more modes of transmission. Such modes of transmission can be realized using one or more interface units such as cellular wireless interface 1556, Wi-Fi interface 1557, USB interface 1558, and Internet interface 1559.

System 1500 can also include electronic apparatus 1535 and a bus 1515, where bus 1515 provides electrical conductivity among the components of system 1500. Bus 1515 can include an address bus, a data bus, and a control bus, each independently configured. In an alternative embodiment, bus 1515 can use common conductive lines for providing one or more of address, data, or control, the use of which is regulated by controller 1505. In an embodiment, electronic apparatus 1535, which can be coupled to bus 1515, may be an additional memory configured in a manner similar to memory 1525. In various embodiments, peripheral devices 1545 include displays, additional storage memory, and/or other control devices that may operate in conjunction with controller 1505 and/or memory 1525. In an embodiment, controller 1505 is a processor. A peripheral device arranged as a display can be used with instructions stored in memory 1525 to implement a user interface to manage one or more system components operable to engage in the transfer of informational content between two mobile electronic devices using a data hub server operable to conduct directed transmission between two servers, each server associated with a different one of the two mobile electronic devices.

Controller 1505, a memory 1525, and communications unit 1555 can be arranged to manage media content and associated information on system 1500. In an embodiment, system 1500 can be arranged as a PC. The PC may include instrumentality distributed throughout the PC to operate as a wireless server. System 1500 can be arranged as server or a data hub server to operate according to any of the various embodiments discussed herein to engage in the sharing of informational content between mobile electronic devices registered as clients in different servers using a data hub server.

In an embodiment, system 1500 can be arranged as a mobile electronic device. The mobile electronic device can be a mobile wireless device. System 1500 arranged as a mobile device can operate according to any of the various embodiments discussed herein to engage in the sharing of informational content with other mobile electronic devices registered as clients in different servers using a data hub server.

Various embodiments or combination of embodiments for apparatus and methods for a system, such as a data hub server, to engage as a system in the transfer of informational content between two mobile electronic devices using directed transmission between two servers and the system, as described herein, can be realized in hardware implementations, software implementations, and combinations of hardware and software implementations. One of the mobile electronic devices can be registered in one of the servers and the other mobile electronic devices can be registered in the other server. These implementations may include a machine-readable medium having machine-executable instructions, such as a computer-readable medium having computer-executable instructions, for operating the system in a relationship with the mobile electronic devices and their associated servers such that transferal of informational content between the system and the servers/mobile electronic devices can be managed. The communications of the system with the servers can be conducted on a secured basis. The machine-readable medium is not limited to any one type of medium.

Various embodiments or combination of embodiments for apparatus and methods for a system, such as a server, to engage as a system in the transfer of informational content between two mobile electronic devices using directed transmission between a data hub server and two servers associated with the two mobile electronic devices, as described herein, can be realized in hardware implementations, software implementations, and combinations of hardware and software implementations. One of the mobile electronic devices can be registered in one of the servers and the other mobile electronic devices can be registered in the other server. These implementations may include a machine-readable medium having machine-executable instructions, such as a computer-readable medium having computer-executable instructions, for operating the system in a relationship with one or more mobile electronic devices such that transferal of informational content between the system and the mobile electronic devices and between the system and a data hub server can be managed. The communications of the system with a mobile wireless device and with the data hub server can be conducted on a secured basis. The machine-readable medium is not limited to any one type of medium.

Various embodiments or combination of embodiments for apparatus and methods for a mobile electronic device, such as a mobile wireless device, as described herein, can be realized in hardware implementations, software implementations, and combinations of hardware and software implementations. These implementations may include a machine-readable medium having machine-executable instructions, such as a computer-readable medium having computer-executable instructions, for operating the mobile electronic device to manage transferal of informational content between the mobile electronic device and an associated server to share the informational content with another mobile electronic device via a data hub server. The communications between a mobile wireless device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:

sending, initiating the sending, or receiving informational content between a first mobile electronic client and a second mobile electronic client using a data hub server with a first server to source the informational content and a second server to access the informational content, the informational content being informational content identified in the first mobile electronic client of the first server to transfer to the second mobile electronic client of the second server, the first server being different from the second server, the first server being an administrator of the first mobile electronic client in a first share group and the second server being an administrator of the second mobile electronic client in a second share group, the first mobile electronic client not in a share group with the second mobile electronic client; and engaging in sending or receiving activities to access the informational content in the data hub server, the informational content being sourced through the first server in a directed transmission from the first server to the data hub server based on a relationship of the first server with the first mobile electronic client of the first server, the sending or receiving activities to access the informational content being based on a registration associated with the second mobile electronic client of the second server, the registration, stored in the data hub server, including an indicator of permission relative to the first mobile electronic client for the second mobile electronic client to access the informational content.

2. The method of claim 1, wherein engaging in sending or receiving activities to access the informational content in the data hub server comprises:

correlating, in the first mobile electronic client, the informational content to a status as being public or partially to a group, the group being registered in the data hub server as having permission to access data specified as public with respect to an association with the first mobile electronic client, the first mobile electronic client configured as a wireless client of the first server; and transmitting, from the first mobile electronic client to the first server, an identification of the informational content.

3. The method of claim 2, wherein identifying, in the first mobile electronic client, the informational content as being public or partially public to a group includes identifying the informational content stored in the first server.

4. The method of claim 2, wherein transmitting, from the first mobile electronic client to the first server, an identification of the informational content includes transmitting the informational content from a USB interface of the first mobile electronic client to the first server.

5. The method of claim 1, wherein engaging in sending or receiving activities to access the informational content in the data hub server comprises:

receiving, in the first server from the first mobile electronic client, an identification of the informational content and an identification of a group, the group being registered in the data hub server as having permission to access data specified as public with respect to an association with the first mobile electronic client, the first mobile electronic client configured as a wireless client of the first server; and transmitting, from the first server to the data hub server, an indication of the informational content as being public to the group.

6. The method of claim 5, wherein receiving the identification of the informational content includes receiving the identification in the first server from the first mobile electronic client over a wireless network.

7. The method of claim 5, wherein transmitting, from the first server to the data hub server, an indication of the informational content as being public to the group includes transmitting the informational content from the first server to the data hub server over a network of interconnected computer networks that interchange data using a standardized protocol.

8. The method of claim 1, wherein engaging in sending or receiving activities to access the informational content in the data hub server comprises:

receiving, in the data hub server from the first server, an indication of the informational content as being public or partially public to a group, the group being registered in the data hub server as having permission to access data specified as public with respect to an association with the first mobile electronic client, the first mobile electronic client configured as a wireless client of the first server, marking a setting in the data hub server representing the informational content as being public or partially public to the group; and transmitting, from the data hub server to the second server, a representation of the informational content as being public or partially public to the second mobile electronic client, the second mobile electronic client configured as a wireless client of the second server.

9. The method of claim 8, wherein the method includes:
receiving, in the data hub server from the second server, a request for a download of content from the data hub server to the second server based on the second mobile electronic client having a permission to access the content; and transmitting the content from the data hub server to the second server in response to the request.

10. The method of claim 8, wherein receiving, in the data hub server from the first server, an indication of the informational content as being public or partially public to a group includes receiving the informational content from the first server at a transmission interface of the data hub server, the transmission interface arranged to receive data over a network of interconnected computer networks that interchange data using a standardized protocol.

11. The method of claim 1, wherein engaging in sending or receiving activities to access the informational content in the data hub server comprises:

receiving, in the second server from the data hub server, a representation of the informational content; and generating a notice to the second mobile electronic client, the notice indicating availability of the informational content for download to the second mobile electronic client, the second mobile electronic client being configured as a wireless client of the second server.

12. The method of claim 11, wherein the method includes transmitting the informational content from a Wi-Fi interface of the second server to the second mobile electronic client.

13. The method of claim 11, wherein the method comprises includes receiving the informational content in the second server from the data hub server over a network of interconnected computer networks that interchange data using a standardized protocol.

14. The method of claim 1, wherein engaging in accessing informational content in a data hub server comprises receiving, in the second mobile electronic client from the second server, a representation of the informational content, the second mobile electronic client configured as a wireless client of the second server.

15. The method of claim 14, wherein the method comprises receiving the informational content at a USB interface of the second mobile electronic client from the second server.

16. The method of claim 14, wherein the method includes browsing contents of the second server from the second mobile electronic client, the contents including data identified as public or partially public relative to an association with the second mobile electronic client, the data being stored in the data hub server.

17. The method of claim 1, wherein the method comprises:
correlating, in the first mobile electronic client, the informational content to a status as being public or partially public to a group registered in the data hub server as having permission to access data specified as public with respect to an association with the first mobile electronic client, the first mobile electronic client configured as a wireless client of the first server;

transmitting, from the first mobile electronic client to the first server, an identification of the informational content and an identification of the group;

transmitting, from the first server to the data hub server, an indication of the informational content as being public to the group;

marking a setting in the data hub server representing the informational content as being public to the group; and transmitting the informational content in the data hub server from data hub server to the second server; and transmitting, from the second server to the second mobile electronic client, the informational content, the second mobile electronic client configured as a wireless client of the second server.

18. A machine readable device that stores instructions, which when performed by a machine, cause the machine to perform operations comprising:

sending, initiating the sending, or receiving informational content between a first mobile electronic client and a second mobile electronic client using a data hub server with a first server to source the informational content and a second server to access the informational content, the informational content being informational content identified in the first mobile electronic client of the first server to transfer to the second mobile electronic client of the second server, the first server being different from the second server, the first server being an administrator of the first mobile electronic client in a first share group and the second server being an administrator of the second mobile electronic client in a second share group, the first mobile electronic client not in a share group with the second mobile electronic client engaging in sending or receiving activities to access the informational content in the data hub server, the informational content being sourced through the first server in a directed transmission from the first server to the data hub server based on a relationship of the first server with the first mobile electronic client of the first server, the sending or receiving activities to access the informational content being based on a registration associated with the second mobile electronic client of the second server, the registration, stored in the data hub server, including an indicator of permission relative to the first mobile electronic client for the second mobile electronic client to access the informational content.

19. The machine readable device of claim 18, wherein the instructions include instructions to operate as the data hub server to perform operations comprising:

receiving, in the data hub server from the first server, an indication of the informational content as being public or partially public to a group, the group being registered in the data hub server as having permission to access data specified as public with respect to an association with the first mobile electronic client, the first mobile electronic client configured as a wireless client of the first server;

marking a setting in the data hub server representing the informational content as being public or partially public to the group; and transmitting, from the data hub server to the second server, a representation of the informational content as being public or partially public to the second mobile electronic client, the second mobile electronic client configured as a wireless client of the second server.

20. The machine readable device of claim 18, wherein the instructions include instructions to operate as the first server to perform operations comprising:

receiving, in the first server from the first mobile electronic client, an identification of the informational content and an identification of a group, the group being registered in the data hub server as having permission to access data specified as public with respect to an association with the first mobile electronic client, the first mobile electronic client configured as a wireless client of the first server; and transmitting, from the first server to the data hub server, an indication of the informational content as being public to the group.

21. The machine readable device of claim 18, wherein the instructions include instructions to operate as the second server to perform operations comprising:

receiving, in the second server from the data hub server, a representation of the informational content; and generating a notice to the second mobile electronic client, the notice indicating availability of the informational content for download to the second mobile electronic client, the second mobile electronic client being configured as a wireless client of the second server.

22. A server comprising:

one or more processors;

memory operatively coupled to the one or more processors, the memory configured to store instructions to configure the server to operate as one of a first server, a second server, or a data hub server in a transfer of informational content between a first mobile electronic client and a second mobile electronic client using the data hub server with the first server to source the informational content and the second server to access the informational content, the informational content being informational content identified in the first mobile electronic client of the first server to transfer to the second mobile electronic client of the second server, the first server being different from the second server, the first server being an administrator of the first mobile electronic client in a first share group and the second server being an administrator of the second mobile electronic client in a second share group such that the first mobile electronic client is not in a share group with the second mobile electronic client, the informational content being sourced through the first server in a directed transmission from the first server to the data hub server based on a relationship of the first server with the first mobile electronic client of the first server, the transfer of the informational content being based on a registration associated with the second mobile electronic client of the second server, the registration, operatively stored in the data hub server, including an indicator of permission relative to the first mobile electronic client for the second mobile electronic client to access the informational content; and a network interface arranged to operatively couple to a network to transmit the informational content.

23. The server of claim 22, wherein the server is configured as the data hub server.

24. A mobile electronic device comprising:

one or more processors;

memory responsive to the one or more processors, the memory arranged to store instructions to:

configure the mobile electronic device operable as a mobile electronic client of a server such that the server is an administrator of the mobile electronic device in a share group;

configure the mobile electronic device operable to send or initiate the sending of informational content to another mobile electronic device using a data hub server with a the server to source the informational content and another server to access the informational content, the informational content being informational content indentified in the mobile electronic device to transfer to the other mobile electronic device that is a mobile electronic client of the other server such that the other server is an administrator of the other mobile electronic device in another share group, the server and the other server being different servers, the mobile electronic device not being in a share group with the other mobile electronic device; and engage in sending activities to access the informational content in the data hub server, the informational content being sourced through the server of the mobile electronic device in a directed transmission from the server to the data hub server based on a relationship of the server with the mobile electronic device, accessing the informational content being based on a registration stored in the data hub server associated with the other mobile electronic device to which the transfer is directed, the registration including an indicator of permission relative to the mobile electronic device for the other mobile electronic device to which the transfer is directed to access the informational content; and a transmission interface responsive to execution of the instructions to transmit the informational content or to receive the informational content.

25. The mobile electronic device of claim 24, wherein the mobile electronic device is configured as mobile wireless device operable to receive other informational content identified in the other mobile electronic device via a directed transmission from the data hub server to the server of the mobile electronic device and operable to engage in accessing the other informational content in the data hub server, the other informational content being sourced through the other server based on a relationship of the other server with the other mobile electronic device, accessing the other informational content being based on a registration in the data hub server associated with the mobile electronic device as the client of the server.

* * * * *